(12) United States Patent
Moricca et al.

(10) Patent No.: US 10,706,980 B2
(45) Date of Patent: Jul. 7, 2020

(54) FILLING DEVICES, SYSTEMS AND METHODS FOR TRANSFERRING HAZARDOUS WASTE MATERIAL INTO A SEALABLE CONTAINER

(75) Inventors: Salvatore Moricca, Woonona (AU); Walter Guillermo Bermudez, Bangor (AU); Allan Grant Murray, Tahmoor (AU)

(73) Assignee: Australian Nuclear Science and Technology Organisation, Lucas Heights (AU)

( * ) Notice: Subject to any disclaimer, the term of this patent is extended or adjusted under 35 U.S.C. 154(b) by 1019 days.

(21) Appl. No.: 14/123,322

(22) PCT Filed: Jun. 2, 2011

(86) PCT No.: PCT/IB2011/002190
§ 371 (c)(1),
(2), (4) Date: Apr. 8, 2014

(87) PCT Pub. No.: WO2012/164335
PCT Pub. Date: Dec. 6, 2012

(65) Prior Publication Data
US 2014/0221720 A1    Aug. 7, 2014

(51) Int. Cl.
*G21F 5/002* (2006.01)
*G21F 5/005* (2006.01)
(Continued)

(52) U.S. Cl.
CPC ............ *G21F 5/005* (2013.01); *B09B 3/0025* (2013.01); *G21F 5/12* (2013.01); *G21F 5/14* (2013.01); *G21F 9/22* (2013.01); *G21F 9/36* (2013.01)

(58) Field of Classification Search
CPC ........................... G01G 19/393; G01G 23/365
(Continued)

(56) References Cited

U.S. PATENT DOCUMENTS 3,444,892 A      5/1969 Doyle et al.
3,531,908 A  *  10/1970 Tuma .................... B65B 55/10
                                                              141/92

(Continued)

FOREIGN PATENT DOCUMENTS

DE        7738502        3/1978
EP        1100733 B1    3/2004
(Continued)

OTHER PUBLICATIONS

Australian Patent Office, International Search Report, PCT/IB2011/002190, dated Jan. 23, 2012 (2 pgs.).
(Continued)

*Primary Examiner* — Andrew M Tecco
*Assistant Examiner* — Eyamindae C Jallow
(74) *Attorney, Agent, or Firm* — Wood Herron & Evans LLP

(57) ABSTRACT

The present invention provides systems, methods and devices for storing and/or disposing of hazardous waste material such as calcined material. In certain embodiments, the system comprises a filling nozzle having a valve body having a distal end and an outer surface, the outer surface proximate the distal end being configured to sealingly and removeably couple to an inner surface of a filling port of the container. In certain embodiments, the method comprises (a) coupling an outer surface of a filling nozzle with an inner surface of a filling port of a container to form a first seal (b) adding hazardous waste material into the container (c) decoupling the filling port from the filling nozzle and (d) inserting a fill plug into the filling port, the fill plug forming a second seal with the inner surface of the filling port, the second seal being distally spaced from at least a portion of the first seal with respect to the container.

19 Claims, 18 Drawing Sheets

(51) Int. Cl.
  *G21F 5/12* (2006.01)
  *G21F 9/36* (2006.01)
  *G21F 5/14* (2006.01)
  *B09B 3/00* (2006.01)
  *G21F 9/22* (2006.01)

(58) Field of Classification Search
  USPC ..... 53/266.1, 284.5; 141/369, 392; 251/332, 251/333
  See application file for complete search history.

(56) References Cited

U.S. PATENT DOCUMENTS

| | | | |
|---|---|---|---|
| 4,084,626 A | 4/1978 | King | |
| 4,274,007 A | 6/1981 | Baatz et al. | |
| 4,519,184 A * | 5/1985 | Brunswick | B65B 3/30 53/133.2 |
| 4,538,692 A * | 9/1985 | Henry | G01G 13/024 177/1 |
| 4,629,587 A * | 12/1986 | Monden | G21F 9/008 250/506.1 |
| 4,637,426 A * | 1/1987 | Lyon | F16K 15/04 137/433 |
| 4,675,129 A | 6/1987 | Baatz et al. | |
| 4,808,337 A | 2/1989 | Ramm et al. | |
| 4,974,646 A | 12/1990 | Martin et al. | |
| 5,337,794 A | 8/1994 | Nishiyama et al. | |
| 5,818,059 A * | 10/1998 | Coyne | G21F 5/005 250/507.1 |
| 6,102,088 A | 8/2000 | Wegman | |
| 6,276,150 B1 * | 8/2001 | Nelson | B67D 1/0081 62/177 |
| 6,739,109 B1 * | 5/2004 | Fan | B65B 7/2878 53/300 |
| 6,874,528 B2 * | 4/2005 | Kozik | F16K 1/385 137/436 |
| 9,285,052 B2 * | 3/2016 | Scherer | F16K 1/14 |
| 2005/0198920 A1 * | 9/2005 | Nakagawa | B65B 9/00 53/64 |
| 2008/0115467 A1 * | 5/2008 | Doyle | B65B 3/28 53/551 |
| 2009/0038708 A1 * | 2/2009 | Hirz | B65B 31/003 141/3 |
| 2009/0149689 A1 | 6/2009 | Crawford et al. | |
| 2012/0222774 A1 * | 9/2012 | Husnu | B65B 3/003 141/69 |

FOREIGN PATENT DOCUMENTS

| | | | | |
|---|---|---|---|---|
| GB | 487631 | | 6/1938 | |
| GB | 487631 A * | | 6/1938 | G01F 11/28 |
| GB | 2012713 | | 8/1979 | |
| JP | S54095700 | | 12/1977 | |
| JP | S62245115 | | 10/1987 | |
| JP | 63142800 | | 9/1988 | |
| JP | 08224567 | | 9/1996 | |
| JP | H08224567 | | 9/1996 | |
| JP | H09118314 | | 5/1997 | |
| JP | 2000033901 | | 2/2000 | |
| RU | 2012080 | | 4/1994 | |
| SU | 558157 | | 5/1977 | |
| WO | 9003648 A1 | | 4/1990 | |
| WO | 9005984 A1 | | 5/1990 | |

OTHER PUBLICATIONS

European Patent Office, Extended European Search Report of corresponding European Application No. EP 11866858, dated Jan. 12, 2015, Munich, Germany.
Japanese Patent Office, Examiner's Report of corresponding Japanese Application, dated Mar. 2, 2015.
Russian Patent Office, Examination Report of corresponding Russian Application.
European Patent Office, Extended European Search Report issued in corresponding European Application No. 18189729.9, dated Dec. 6, 2018 (8 pages).
Berry, S.M., et. al., "Conceptual Design for Remote Handling Methods Using the HIP Process in the Calcine Immobilation Program," U.S. Report WINCO-1213, Westinghouse Nuclear Co., Inc., Idaho Falls, ID, Mar. 1994 (42 pages).
Blair, H.T., "Full-Scale In-Can Melter Demonstration for Vitrification of Nuclear Waste," Battelle Pacific Northwest Labs., Published Jan. 1, 1979, Presented at ANS annual meeting, San Diego, CA, PNL-SA-6768 (24 pages).
Berry, S.M., et. al., "Friction Welding Method of Hot Isostatic Press Can Closure for the ICPP Calcine Immobilization Program," U.S. Report WINCO-1160, UC-510, Westinghouse Idaho Nuclear Co., Inc., Idaho Falls, ID, Sep. 1993 (26 pages).
Bolon, W.D., et al., "Status Report: The Glass-Ceramic Processing Flowsheet for ICPP High-Level Waste," U.S. Report WINCO-1090, Westinghouse Idaho Nuclear Company, Inc., Dec. 1991 (54 pages).
European Patent Office, Notice of Opposition filed in European Application No. 11866858.1 (EP Pat No. 2715738), dated May 22, 2019 (39 pages).
Granthan, L.F., et. al., "Ceramic Process and Plant Design for High-Level Nuclear Waste Immobilization," Waste Isolation in the U.S., Technical Programs and Public Education: vol. 2—Waste Regulations and Programs: High-Level Waste, Waste Management 83, pp. 213-219, Tucson, AZ 1983 (10 pages).
Grantham, L.F., et. al., "Process Description and Plant Design for Preparing Ceramic High-Level Waste Forms," U.S. Report DOE/ET/41900-16 (ESG-DOE-13397), Rockwell International, Feb. 25, 1983 (82 pages).
Holton, L.K., "West Valley Demonstration Project: Alternative Processes for Solidifying the High-Level Wastes," Prepared for the U.S. Department of Entergy under Contract DE-AC06-76RLO 1830 Pacific Northwest Laboratory, Oct. 1981 (318 pages).
Levins, D.M., et. al., "For Presentation at the Second International Conference on Radioactive Waste Management, Winnipeg, Canada, Sep. 7-11, 1986: The Synroc Demonstration Plant," pp. 576-583 in Proceedings 2nd International Conference on Radioactive Waste Management, Canadian Nuclear Society (8 pages).
Office of Scientific and Technical Information, "The Office of Environmental Management technical reports: A bibliography," DOE/OSTI-3411/1, Jan. 1996 (10 pages).
Reeve, K.D., "Solid Progress at Synroc Demo Plant," Nuclear Engineering International, vol. 30, No. 374, Sep. 1985 (4 pages).
Treat, R.L., et al., "Preliminary Evaluation of Alternative Waste from Solidification Processes: vol. 1: Identification of the Process," U.S. Report, Pacific Northwest Laboratory, PNL-3244, Apr. 1980 (562 pages).
Brazilian Patent Office; Examination Report in related Brazilian Patent Application No. BR112013030979-2 dated Oct. 1, 2019; 7 pages.
Japanese Patent Office, Pre-Appeal Examination Report issued in corresponding Japanese Patent Application No. 2014-513261 dated Aug. 22, 2017.

* cited by examiner

FILLING DEVICES, SYSTEMS AND METHODS FOR TRANSFERRING HAZARDOUS WASTE MATERIAL INTO A SEALABLE CONTAINER

This application claims priority, under Section 371 and/or as a continuation under Section 120, to PCT Application No. PCT/IB2011/002190, filed on Jun. 2, 2011.

BACKGROUND OF THE INVENTION

The present invention generally relates to systems, methods and containers for storing hazardous waste material and, more particularly, filling devices, systems and methods for transferring hazardous waste material into a sealable container.

Despite a proliferation of systems for handling and storing hazardous waste materials, prior art systems are still unable to effectively confine and control the unnecessary spread of hazardous waste contamination to areas remotely located from the hazardous waste material filling stations. Therefore, an urgent need exists for hazardous waste processing/storing systems that effectively minimize and/or eliminate unnecessary hazardous material contamination.

There is disclosed herein a system for transferring hazardous waste material into a sealable container, the system comprising:
 a filling nozzle having:
 a valve body having a distal end and an outer surface, the valve body including a valve seat proximate the distal end, the outer surface proximate the distal end being configured to sealingly and removeably couple the valve body to an inner surface of a filling port of the container,
 a valve head having a valve face configured to form a seal with the valve seat in a closed configuration, the valve head configured to allow the valve body and the container to be fluidly coupled with one another in an open configuration, and
 a valve stem extending axially from the valve head through at least a portion of the valve body.

Preferably, the system further comprises:
 a container configured to sealingly contain the hazardous waste material, the container including the filling port.

Preferably, the system further comprises:
 a hopper;
 a first scale coupled to the hopper and configured to determine an initial hopper weight;
 a second scale coupled to the container and configured to determine a container fill weight; and
 a processor coupled to the first scale and the second scale and configured to compare the initial hopper weight to the container fill weight.

Preferably, the hopper includes a volume substantially equal to a volume of the container.

Preferably the system further comprises:
 at least one vibrator coupled to the hopper.

Preferably, the system further comprises:
 at least one vibrator coupled to a bottom of the container.

Preferably, the system further comprises:
 at least one vibrator coupled to a sidewall of the container.

Preferably, the system further comprises:
 a lift mechanism configured to lift the container toward the fill nozzle Preferably, the lift mechanism including at least one damper.

Preferably, the system further comprises:
 a sensor disposed in the valve head.

Preferably, the sensor is configured to determine a level of hazardous material in the container.

Preferably, the sensor extends distally from the valve body.

Preferably, the sensor is coupled to a wire that extends through the valve stem.

Preferably, the valve body includes:
 a first branch section configured to couple to a hopper, and
 a second branch section including the distal end and having a proximal end, the proximal end coupled to a drive mechanism configured to move the valve stem.

Preferably, the drive mechanism includes a pneumatic cylinder.

Preferably, the valve stem extends through the proximal end of the second branch section, the proximal end including a seal coupled to a portion of the valve stem.

Preferably, the system further comprises:
 a vacuum nozzle configured to be in fluid communication with the container.

Preferably, the vacuum nozzle extends through the distal end of the valve body.

Preferably, the vacuum nozzle includes a filter proximate the distal end of the valve body.

Preferably, the container includes an exhaust port.

Preferably, the exhaust port includes a filter.

Preferably, the system further comprises a vacuum nozzle sealingly and removeably couplable with the exhaust port, the vacuum nozzle being in sealed fluid communication with the valve body in a filling configuration.

Preferably, the outer surface proximate the distal end includes at least one seal.

Preferably, the at least one seal includes at least one o-ring.

Preferably, the valve head extends distally from the valve body and into the container in the open configuration.

Preferably, the container is at least initially under negative pressure.

Preferably the filing port of the container is configured to be sealed closed after decoupling the valve body from the filling port.

A method of transferring hazardous waste material into a sealable container, the method comprising:
 coupling an outer surface of a filling nozzle with an inner surface of a filling port of a container to form a first seal;
 opening a valve of a filling nozzle to add hazardous waste material into the container, the valve being proximate the first seal;
 closing the valve of the filling nozzle;
 decoupling the filling port from the filling nozzle and inserting a fill plug into the filling port, the fill plug forming a second seal with the inner surface of the filling port, the second seal being distally spaced from at least a portion of the first seal with respect to the container.

Preferably the valve includes:
 a valve body having a distal end and an outer surface, the valve body including a valve seat proximate the distal end, the outer surface proximate the distal end being configured to sealingly and removeably couple the valve body to the filling port of the container,
 a valve head having a valve face configured to form a seal with the valve seat in a closed configuration, the valve head configured to allow the valve body and the container to be fluidly coupled with one another in an open configuration, and
 a valve stem extending axially from the valve head through at least a portion of the valve body.

Preferably, the container includes an evacuation port.

Preferably, the evacuation port includes an evacuation plug threadably coupled to the evacuation port, the method further comprising:

allowing air and/or gas to pass through the filter and between the evacuation plug and the evacuation port in a filling configuration and a heating configuration; and closing the evacuation port with the evacuation plug in a closed configuration.

Preferably, the evacuation port includes a filter.

Preferably, the method further comprises:

drawing air within the container displaced by the hazardous material through an evacuation nozzle coupled to the container, the evacuation nozzle being in sealed fluid communication with the valve body via the container.

Preferably, the method further comprises:

lifting the container toward the filling nozzle via a lifting mechanism to couple the filling port and the filling nozzle.

Preferably, the method further comprises:

weighing a hopper containing the hazardous material to determine an initial hopper weight;

weighing the container while adding the hazardous material to determine a container fill weight; and comparing, via a processor, the difference between the initial hopper weight to the container fill weight.

Preferably, the method further comprises:

closing the valve once the container fill weight equals the initial hopper weight.

Preferably, the method further comprises:

vibrating the hopper via at least one vibrator while adding the hazardous material to the container.

Preferably, the method further comprises:

vibrating the container via at least one vibrator coupled to the container while adding the hazardous material to the container.

Preferably, the method further comprises:

measuring the level of hazardous material in the container via a sensor disposed in the valve head.

Preferably, first seal includes at least one o-ring.

Preferably, the second seal includes a gasket, the gasket being comprised of one or more of metal, ceramic or graphite.

Preferably, the method further comprises:

applying a vacuum to the container before or during adding of the hazardous material.

Preferably, the method further comprises:

permanently sealing the fill plug to the filling port; and heating and reducing the volume of the container after permanently sealing the fill plug to the filling port.

Preferably, the hazardous waste material includes calcined material.

BRIEF SUMMARY OF THE INVENTION

In some embodiments, there are systems, methods and devices for storing and/or disposing of hazardous waste material. In some embodiments, the hazardous waste material includes nuclear waste such as calcined material.

In one embodiment, there is system for transferring hazardous waste material into a sealable container, the system includes a filling nozzle having (a) a valve body having a distal end and an outer surface, the valve body including a valve seat proximate the distal end, the outer surface proximate the distal end being configured to sealingly and removeably couple the valve body to an inner surface of a filling port of the container, (b) a valve head having a valve face configured to form a seal with the valve seat in a closed configuration, the valve head configured to allow the valve body and the container to be fluidly coupled with one another in an open configuration, and (c) a valve stem extending axially from the valve head through at least a portion of the valve body. In a further embodiment, the system includes a container configured to sealingly contain the hazardous waste material, the container including the filling port. In a further embodiment, the system includes a hopper, a first scale coupled to the hopper and configured to determine an initial hopper weight, a second scale coupled to the container and configured to determine a container fill weight, and a processor coupled to the first scale and the second scale and configured to compare the initial hopper weight to the container fill weight.

In one embodiment, the hopper includes a volume substantially equal to a volume of the container. In a further embodiment, the system includes at least one vibrator coupled to the hopper. In a further embodiment, the system includes at least one vibrator coupled to a bottom of the container. In a further embodiment, the system includes at least one vibrator coupled to a sidewall of the container. In a further embodiment, the system includes a lift mechanism configured to lift the container toward the fill nozzle.

In one embodiment, the lift mechanism including at least one damper. In a further embodiment, the system includes a sensor disposed in the valve head. In one embodiment, the sensor is configured to determine a level of hazardous material in the container. In one embodiment, the sensor extends distally from the valve body. In one embodiment, the sensor is coupled to a wire that extends through the valve stem. In one embodiment, the valve body includes a first branch section configured to couple to a hopper, and a second branch section including the distal end and having a proximal end, the proximal end coupled to a drive mechanism configured to move the valve stem. In one embodiment, the drive mechanism includes a pneumatic cylinder. In one embodiment, the valve stem extends through the proximal end of the second branch section, the proximal end including a seal coupled to a portion of the valve stem. In a further embodiment, the system includes a vacuum nozzle configured to be in fluid communication with the container. In one embodiment, the vacuum nozzle extends through the distal end of the valve body. In one embodiment, the vacuum nozzle includes a filter proximate the distal end of the valve body.

In one embodiment, the container includes an exhaust port. In one embodiment, the exhaust port includes a filter. In a further embodiment, the system includes a vacuum nozzle sealingly and removeably couplable with the exhaust port, the vacuum nozzle being in sealed fluid communication with the valve body in a filling configuration. In one embodiment, the outer surface proximate the distal end includes at least one seal. In one embodiment, the at least one seal includes at least one o-ring. In one embodiment, the valve head extends distally from the valve body and into the container in the open configuration. In one embodiment, the container is at least initially under negative pressure. In one embodiment, the filling port of the container is configured to be sealed closed after decoupling the valve body from the filling port.

In another embodiment, there is a method of transferring hazardous waste material into a sealable container, the method comprising (a) coupling an outer surface of a filling nozzle with an inner surface of a filling port of a container to form a first seal, (b) opening a valve of a filling nozzle to add hazardous waste material into the container, the valve being proximate the first seal, (c) closing the valve of the filling nozzle, (d) decoupling the filling port from the filling nozzle and (e) inserting a fill plug into the filling port, the fill plug forming a second seal with the inner surface of the filling port, the second seal being distally spaced from at least a portion of the first seal with respect to the container. In one embodiment, the valve includes, a valve body having a distal end and an outer surface, the valve body including a valve seat proximate the distal end, the outer surface proximate the distal end being configured to sealingly and removeably couple the valve body to the filling port of the container, a valve head having a valve face configured to form a seal with the valve seat in a closed configuration, the valve head configured to allow the valve body and the container to be fluidly coupled with one another in an open configuration, and a valve stem extending axially from the valve head through at least a portion of the valve body.

In one embodiment, the container includes an evacuation port. In one embodiment, the evacuation port includes an evacuation plug threadably coupled to the evacuation port and the method further comprises (f) allowing air and/or gas to pass through the filter and between the evacuation plug and the evacuation port in a filling configuration and a heating configuration, and (g) closing the evacuation port with the evacuation plug in a closed configuration. In one embodiment, the evacuation port includes a filter. In a further embodiment, the method includes drawing air within the container displaced by the hazardous material through an evacuation nozzle coupled to the container, the evacuation nozzle being in sealed fluid communication with the valve body via the container.

In a further embodiment, the method includes lifting the container toward the filling nozzle via a lifting mechanism to couple the filling port and the filling nozzle. In a further embodiment, the method includes (t) weighing a hopper containing the hazardous material to determine an initial hopper weight, (g) weighing the container while adding the hazardous material to determine a container fill weight, and (h) comparing, via a processor, the difference between the initial hopper weight to the container fill weight. In a further embodiment, the method includes closing the valve once the container fill weight equals the initial hopper weight. In a further embodiment, the method includes vibrating the hopper via at least one vibrator while adding the hazardous material to the container. In a further embodiment, the method includes, vibrating the container via at least one vibrator coupled to the container while adding the hazardous material to the container. In a further embodiment, the method includes measuring the level of hazardous material in the container via a sensor disposed in the valve head.

In one embodiment, wherein the first seal includes at least one o-ring. In one embodiment, the second seal includes a gasket, the gasket being comprised of one or more of metal, ceramic or graphite. In a further embodiment, the method includes applying a vacuum to the container before or during adding of the hazardous material. In a further embodiment, the method includes (f) permanently sealing the fill plug to the filling port, and (g) heating and reducing the volume of the container after permanently sealing the fill plug to the filling port.

BRIEF DESCRIPTION OF THE SEVERAL VIEWS OF THE DRAWINGS

The foregoing summary, as well as the following detailed description of embodiments of the systems, methods and containers for storing hazardous waste material, will be better understood when read in conjunction with the appended drawings of exemplary embodiments. It should be understood, however, that the invention is not limited to the precise arrangements and instrumentalities shown.

In the drawings.

DETAILED DESCRIPTION OF THE INVENTION

Reference will now be made in detail to the various embodiments of the present disclosure, examples of which are illustrated in the accompanying drawings FIGS. 2-17. Wherever possible, the same reference numbers will be used throughout the drawings to refer to the same or like parts.

Nuclear waste, such as radioactive calcined material, can be immobilized in a container that allows the waste to be safely transported in a process known as hot isostatic pressing (HIP). In general, this process involves combining the waste material in particulate or powdered form with certain minerals and subjecting the mixture to high temperature and high pressure to cause compaction of the material.

In some instances, the HIP process produces a glass-ceramic waste form that contains several natural minerals that together incorporate into their crystal structures nearly all of the elements present in HLW calcined material. The main minerals in the glass-ceramic can include, for example, hollandite ($BaAl_2Ti_6O_{16}$), zirconolite ($CaZrTi_2O_7$), and perovskite ($CaTiO_3$). Zirconolite and perovskite are the major hosts for long-lived actinides, such as plutonium, though perovskite principally immobilizes strontium and barium. Hollandite principally immobilizes cesium, along with potassiume, rubidium, and barium.

Treating radioactive calcined material with the HIP process involves, for example, filling a container with the calcined material and minerals. The filled container is evacuated and sealed, then placed into a HIP furnace, such as an insulated resistance-heated furnace, which is surrounded by a pressure vessel. The vessel is then closed, heated, and pressurized. The pressure is applied isostatically, for example, via argon gas, which, at pressure, also is an efficient conductor of heat. The combined effect of heat and pressure consolidates and immobilizes the waste into a dense monolithic glass-ceramic sealed within the container.

Figure 1A:
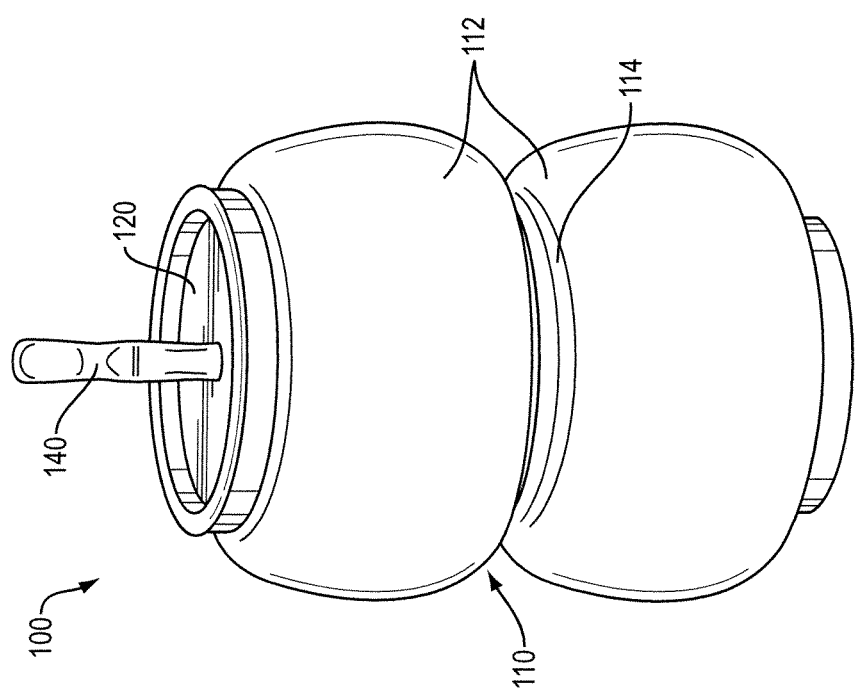
FIG. 1A is a perspective view of a known container shown prior to a HIP process.
Figure 1B:
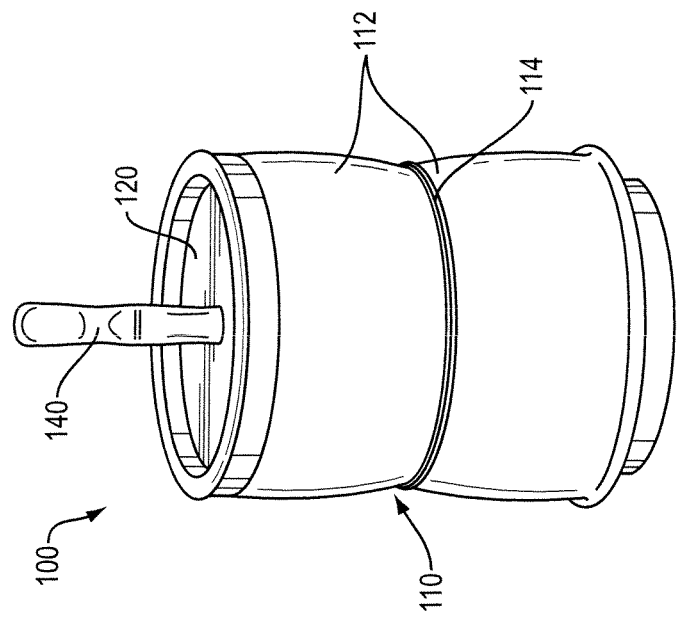
FIG. 1B is a perspective view of the container of FIG. 1A shown after the HIP process.

FIGS. 1A and 1B respectively show an example container, generally designated 100, before and after HIP processing. Container 100 has a body 110 defining an interior volume for containing waste material. Body 110 includes sections 112 each having a first diameter and a section 114 having a second diameter that may be less than the first diameter. Container 100 further has a lid 120 positioned at a top end of body 110 and a tube 140 extending from lid 120 which communicates with the interior volume of body 110. The interior volume of body 110 is filled with waste material via tube 140.

Following hot isostatic pressing, as shown in FIG. 1B, the volume of body 110 is substantially reduced and container 100 is then sealed. Typically, tube 140 is crimped, cut, and welded by linear seam welding. One drawback in such a process is that cutting of tube 140 can create secondary waste as the removed portion of tube 140 may contain amounts of residual waste material which must then be disposed of in a proper manner. Moreover, the tools used for cutting tube 140 may be exposed to the residual waste material and/or require regular maintenance or replacement due to wear. Also, this system requires complex mechanical or hydraulic systems to be in the hot cell (radioactive environment) near the can to be sealed reducing the life of seals on hydraulic rams and the equipment is bulky taking up additional space in the hot cell. It is therefore desirable to have systems, methods, filling equipment and containers for storing hazardous waste material that can avoid one or more of these drawbacks.

Figure 2:
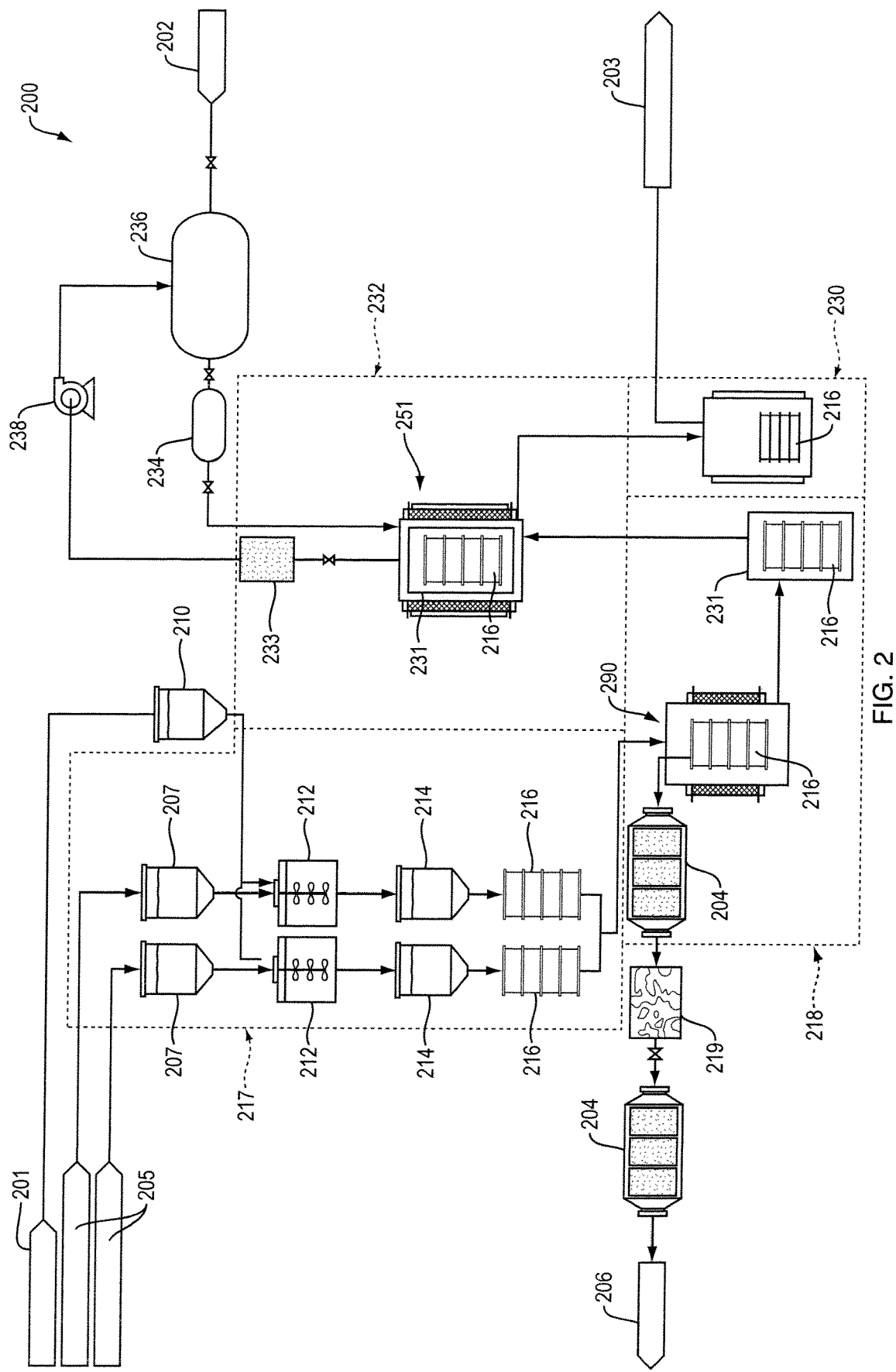
FIG. 2 is a schematic flow diagram of a process for storing hazardous waste in accordance with an exemplary embodiment of the present invention.

FIG. 2 schematically represents an exemplary process flow 200 used to dispose of nuclear waste, such as calcined material, in accordance with the present invention. Process 200 may be performed using a modular system 400, exemplary embodiments of which are illustrated in subsequent figures, wherein the hazardous waste is processed or moved in a series of isolated cells. Modular system 400 may be referred to as including the "hot cell" or "hot cells". In some embodiments, each cell is isolated from the outside environment and other cells such that any spillage of hazardous waste may be contained within the cell in which the spill occurred.

Modular system 400 in accordance with the present invention may be used to process liquid or solid hazardous waste material. The hazardous waste material may be a radioactive waste material. A radioactive liquid waste may include aqueous wastes resulting from the operation of a first cycle solvent extraction system, and/or the concentrated wastes from subsequent extraction cycles in a facility for reprocessing irradiated nuclear reactor fuels. These waste materials may contain virtually all of the nonvolatile fission products, and/or detectable concentrations of uranium and plutonium originating from spent fuels, and/or all actinides formed by transmutation of the uranium and plutonium as normally produced in a nuclear reactor. In one embodiment, the hazardous waste material includes calcined material.

Modular system 400 may be divided into two or more cells. In one embodiment, modular system 400 includes at least four separate cells. In one embodiment, modular system 400 includes four separate cells. In one such embodiment, the series of cells include a first cell 217, which may be a filling cell, a second cell 218, which may be a bake-out and vacuum sealing cell, a third cell 232 which may be a process cell, and a fourth cell 230 which may be a cooling and packaging cell, each of which will be discussed in more detail below.

In one embodiment, first cell 217 includes a feed blender 212 configured to mix a hazardous waste material with one or more additives. In one embodiment, a container feed hopper 214 is coupled to feed blender 212. In one embodiment, container feed hopper 214 is coupled with a fill system to transfer the hazardous waste material and additive mixture into container 216. In some embodiments, calcined material is transferred from a surge tank 205 to a calcined material receipt hopper 207 configured to supply feed blender 212. In some embodiments, additives are supplied to feed blender 212 from hopper 210. In some embodiments, the additives are transferred to hopper 210 from tank 201.

After being filled, container 216 is removed from first cell 217 and transferred to second cell 218 where bake-out and vacuum sealing steps take place. In some embodiments, the bake-out process includes heating container 216 in a furnace 290 to remove excess water, for example, at a temperature of about 400° C. to about 500° C. In some embodiments, off-gas is removed from container 216 during the bake-out process and routed through line 206, which may include one or more filters 204 or traps 219 to remove particulates or other materials. In further embodiments, a vacuum is established in container 216 during the bake-out process and container 216 is sealed to maintain the vacuum.

After the bake-out and sealing steps, according to some embodiments, container 216 is transferred to third cell 232 where the container 216 is subjected to hot isostatic pressing or HIP, for example, at elevated temperature of 1000° C.-1250° C. and elevated argon pressure supplied from a compressor 234 and argon source 236. In some embodiments, hot isostatic pressing results in compaction of container 216 and the waste material contained therein. After the hot isostatic pressing, according to some embodiments, container 216 is transferred to fourth cell 230 for cooling and/or packaging for subsequent loading 203 for transport and storage.

Modular system 400 may be configured in numerous ways depending on the spatial arrangement of the plurality of cells. In an embodiment, the plurality of cells may have any suitable spatial arrangement, including a lateral arrangement of cells, a vertical arrangement of cells or a combination of laterally arranged cells and vertical arranged cells. In one embodiment, modular system 400 comprises a plurality of cells spatially arranged in a single row of contiguous cells, wherein each cell is isolated from an adjacent cell. In another embodiment, the plurality of cells may be spatially arranged in a single row of contiguous cells, wherein each cell may be isolated from an adjacent cell by at least one common side wall. In another embodiment, the plurality of cells may be arranged vertically in space in single column of contiguous cells, wherein each cell is isolated from an adjacent cell by at least one common wall. In yet another embodiment, the plurality of cells may be spatially arranged in a plurality of rows of contiguous cells.

In one embodiment, modular system 400 includes a first cell 217, a second cell 218, and a third cell 232, first cell 217 being adjacent second cell 218 and contiguous therewith, and third cell 232 being adjacent to second cell 218 and being contiguous therewith, wherein first cell 217, second cell 218 and third cell 232 are spatially arranged in a single row of cells.

Figure 3:
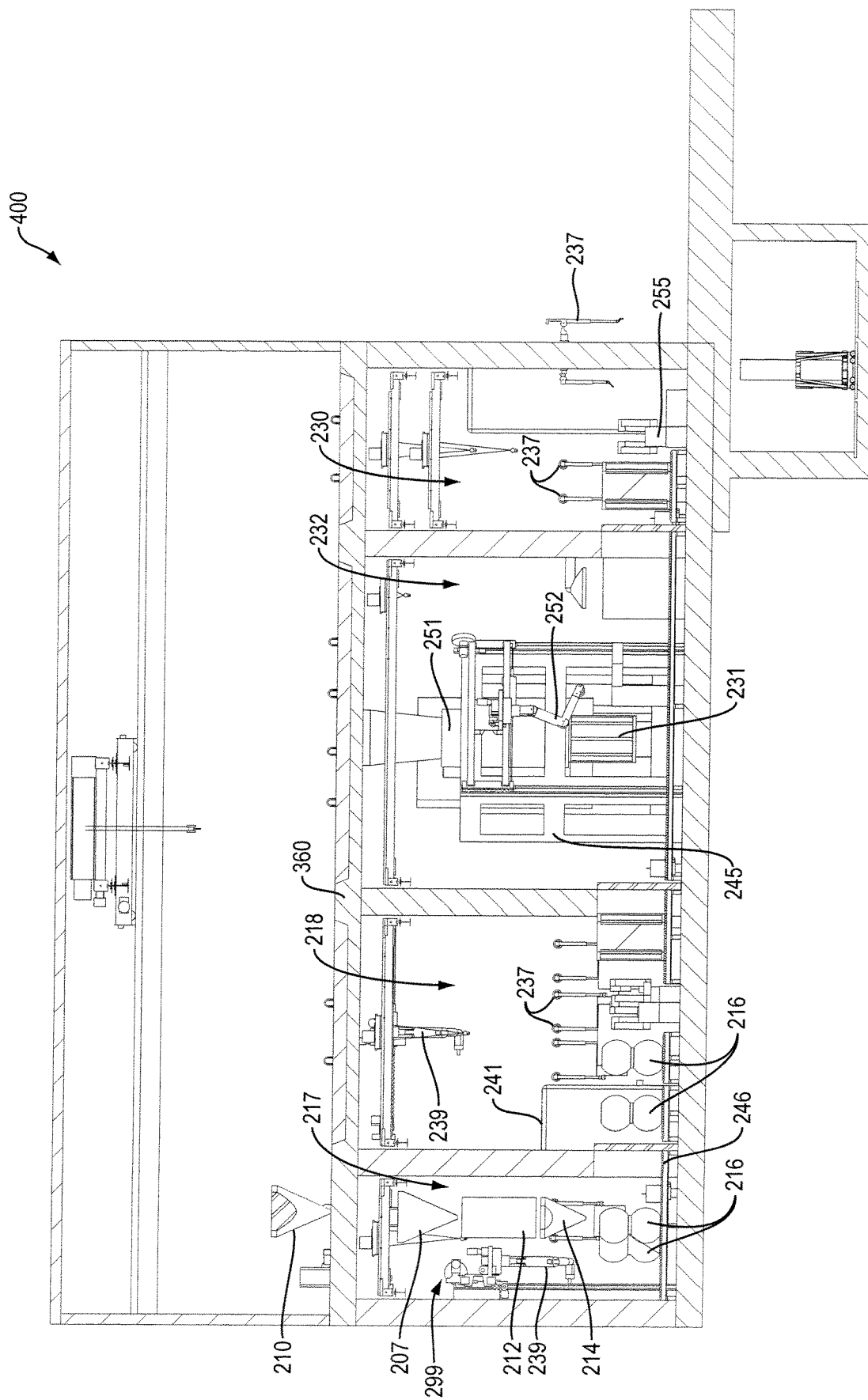
FIG. 3 is a side partial cross sectional elevational view of a modular system in accordance with an exemplary embodiment of the present invention.
Figure 4:
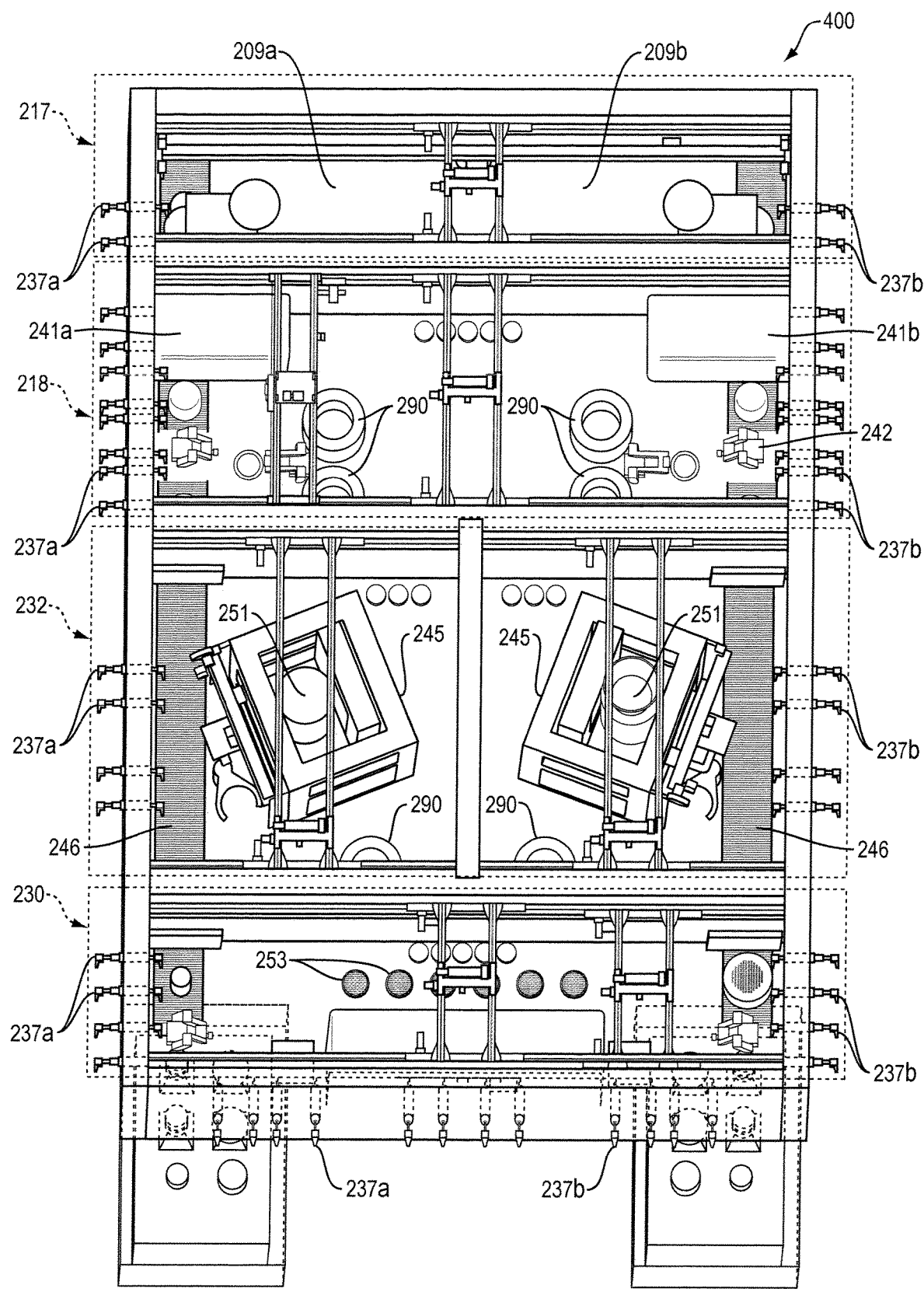
FIG. 4 is a top planar view of the modular system of FIG. 3 shown with the top partially removed.

Modular system 400 may contain one or more assembly lines that move containers 216 sequentially through modular system 400. As illustrated in FIGS. 2-4, an exemplary modular system 400 for processing and/or storing and/or disposing of a hazardous waste material includes parallel assembly lines of a plurality of cells for manipulating container 216.

In some embodiments, as described above, the plurality of cells for manipulating container 216 includes at least first cell 217, second cell 218, third cell 232 and fourth cell 230. In other embodiments, any number of cells may be provided. In some embodiments, the cells may be held at different pressures relative to adjacent cells to control contamination from spreading between cells. For example, each subsequent cell may have a higher pressure than the previous cell such that any air flow between cells flows toward the beginning of the process. In some embodiments, first cell 217 is held at a first pressure P1 and second cell 218 is held at a second pressure P2. In one embodiment, first pressure P1 is less than second pressure P2. In such embodiments, first cell 217 does not exchange air with second cell 218 at least during the time when container 216 is being manipulated in first cell 217. In another such embodiment, an air interlock 241 (see FIG. 12), as described in further detail below, couples first cell 217 to second cell 218 and is configured to allow transfer of container 216 from first cell 217 to second cell 218 while maintaining at least one seal between first cell 217 and second cell 218. In another embodiment, first cell 217 is held at first pressure P1, second cell is held at second pressure P2 and third cell 232 is held at a third pressure P3, where third pressure P3 is greater than second pressure P2 which is greater than first pressure P1. In such embodiments, third cell 232 is isolated from first cell 217 and second cell 218, wherein second cell 218 and third cell 232 are configured to allow transfer of container 216 from second cell 218 to third cell 232. In yet another embodiment, first cell 217 is held at first pressure P1, second cell 218 is held at second pressure P2, third cell 232 is held at third pressure P3 and fourth cell 230 is held at a fourth pressure P4, wherein fourth pressure P4 is greater than third pressure P3, third pressure P3 is greater than second pressure P2 which is greater than first pressure P1. In such embodiments, fourth cell 230 is isolated from first cell 217, second cell 218 and third cell 232, wherein third cell 232 and fourth cell 230 are configured to allow transfer of container 216 from third cell 232 to the fourth cell 230. In one embodiment, each pressure P1, P2, P3 and/or P4 is negative relative to normal atmospheric pressure. In some embodiments, the pressure difference between first cell 217 and second cell 218 is about 10 KPa to about 20 KPa. In some embodiments, the pressure difference between second cell 218 and third cell 232 is about 10 KPa to about 20 KPa. In some embodiments, the pressure difference between third cell 232 and fourth cell 230 is about 10 KPa to about 20 KPa.

I. First Cell

Figure 7:
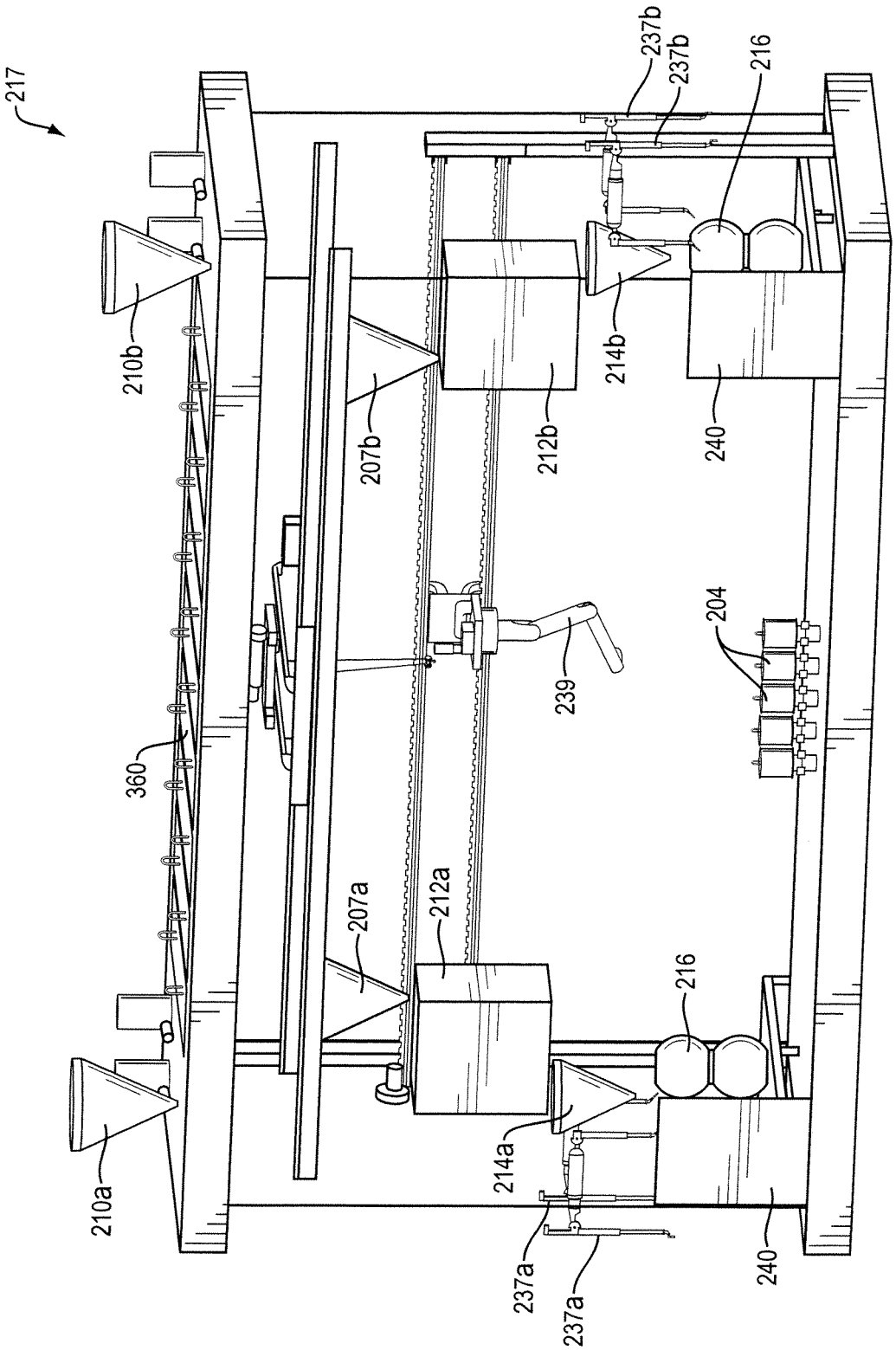
FIG. 7 is a front perspective view of a first cell of the exemplary modular system of FIGS. 3 and 4 with the front wall removed.

Exemplary embodiments of first cell 217 are illustrated in FIGS. 3, 4 and 7. In one embodiment, first cell 217 is a filling cell which allows for filling a container 216 with hazardous waste with minimal contamination of the exterior of container 216. In one embodiment, empty containers 216 are first introduced into the modular system 400. In one embodiment, empty containers 216 are placed in first cell 217 and first cell 217 is sealed before transferring any hazardous waste material within first cell 217. In one embodiment, once first cell 217 is sealed and contains one or more empty containers 216, first cell 217 is brought to pressure P1.

Container and Method of Filling a Container

Containers of various designs may be used in accordance with the various embodiments of the present disclosure. A schematic container 216, which may be a HIP can, is shown throughout in FIGS. 2, 3, 4, 7, 13, 15, 16 and 17. Container 216 may have any suitable configuration known in the art for HIP processing. In some embodiments, container 216 is provided with a single port. In other embodiments, container 216 is provided with a plurality of ports. Some particular configurations for containers 216 that may be used in accordance with the various embodiments of the present invention are shown in FIGS. 5A, 5B, 6A and 6B, which illustrate exemplary containers configured to sealingly contain hazardous waste material in accordance with the present disclosure.

Figure 5B:
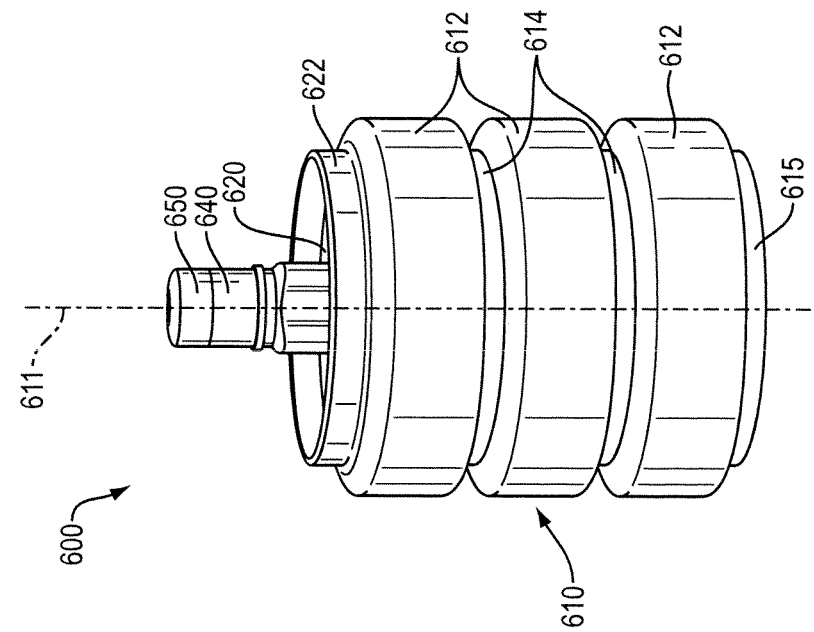
FIG. 5B is a perspective view of a container having a single port in accordance with an exemplary embodiment of the present invention.
Figure 5A:
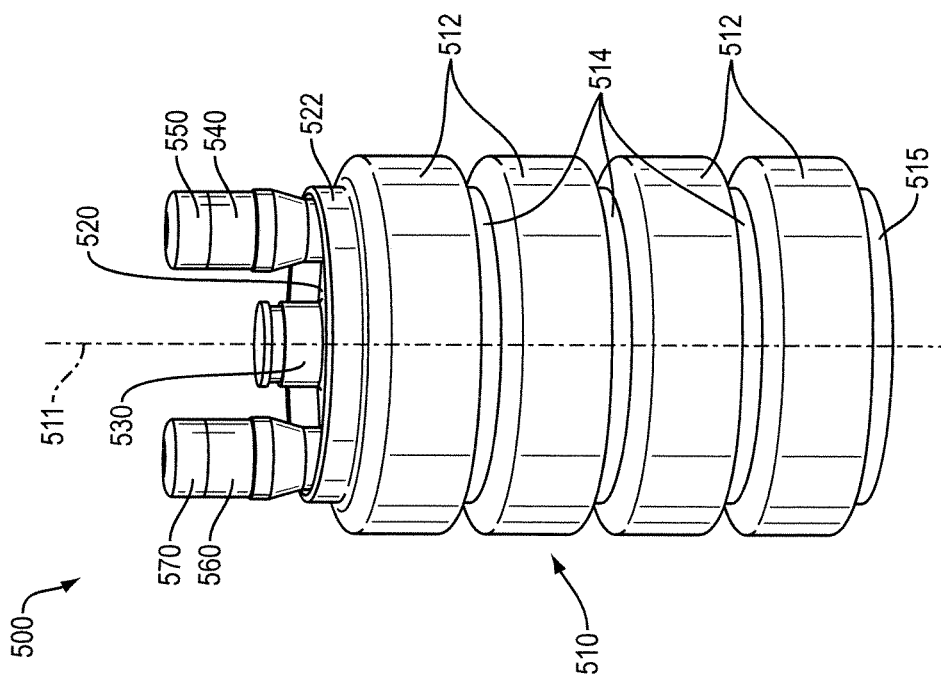
FIG. 5A is a perspective view of a container having fill and evacuation ports in accordance with an exemplary embodiment of the present invention.
Figure 6A:
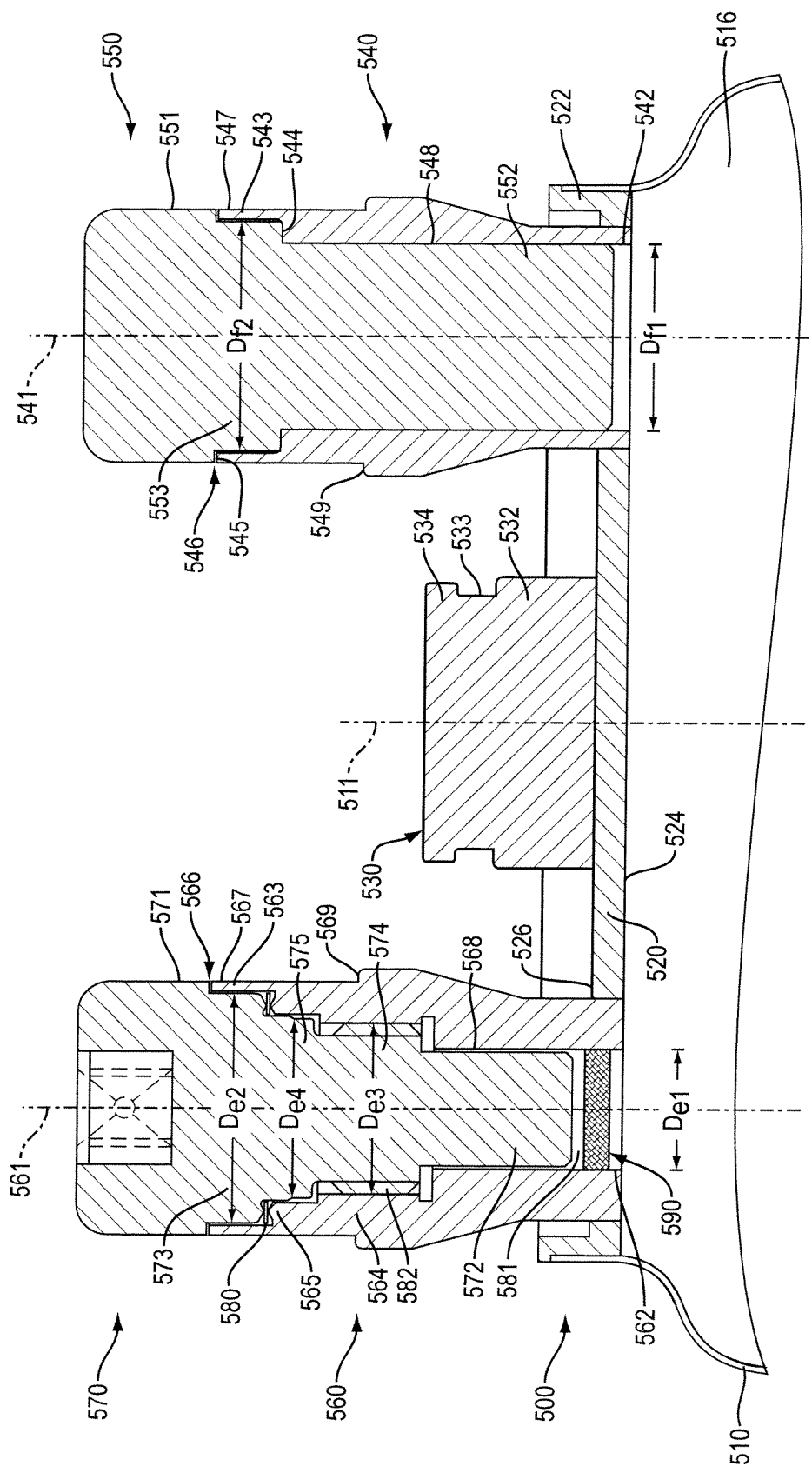
FIG. 6A is a side cross sectional view of a top portion of the container shown in FIG. 5A.

FIGS. 5A and 6A show one embodiment of a container, generally designated 500, for containment and storage of nuclear waste materials or other desired contents in accordance with an exemplary embodiment of the present invention. Container 500, in some embodiments, is particularly useful in HIP processing of waste materials. It should however be understood that container 500 can be used to contain and store other materials including nonnuclear and other waste materials.

According to some embodiments, container 500 generally includes body 510, lid 520, filling port 540, and evacuation port 560. In some embodiments, container 500 also includes filling plug 550 configured to engage with filling port 540. In further embodiments, container 500 also includes evacuation plug 570 configured to engage with evacuation port 560. In yet further embodiments, container 500 includes lifting member 530.

Body 510 has a central longitudinal axis 511 and defines interior volume 516 for containing nuclear waste materials or other materials according to certain embodiments of the invention. In some embodiments, a vacuum can be applied to interior volume 516. In some embodiments, body 510 has a cylindrical or a generally cylindrical configuration having closed bottom end 515. In some embodiments, body 510 is substantially radially symmetric about central longitudinal axis 511. In some embodiments, body 510 may be configured to have the shape of any of the containers described in U.S. Pat. No. 5,248,453, which is incorporated herein by reference in its entirety. In some embodiments, body 510 is configured similarly to body 110 of container 100 shown in FIG. 1. Referring to FIG. 5A, in some embodiments body 510 has one or more sections 512 having a first diameter alternating along central longitudinal axis 511 with one or more sections 514 having a smaller second diameter. Body 510 may have any suitable size. In some embodiments, body 510 has a diameter in a range of about 60 mm to about 600 mm. In some embodiments, body 510 has a height in a range of about 120 mm to about 1200 mm. In some embodiments, body 510 has a wall thickness of about 1 mm to about 5 mm.

Body 510 may be constructed from any suitable material known in the art useful in hot isostatic pressing of nuclear waste materials. In some embodiments, body 510 is constructed of material capable of maintaining a vacuum within body 500. In some embodiments, body 510 is constructed from a material that is resistant to corrosion. In some embodiments, body 510 is made from a metal or metal alloy, for example, stainless steel, copper, aluminum, nickel, titanium, and alloys thereof.

In some embodiments, container 500 includes a lid 520 opposite closed bottom end 515. Lid 520, in some embodiments, is integrally formed with body 510. In other embodiments, lid 520 is formed separately from body 510 and secured thereto, for example, via welding, soldering, brazing, fusing or other known techniques in the art to form a hermetic seal circumferentially around lid 520. In some embodiments, lid 520 is permanently secured to body 510. Referring to FIG. 6A, lid 520 includes interior surface 524 facing interior volume 516 and exterior surface 526 opposite interior surface 524. In some embodiments, central longitudinal axis 511 is substantially perpendicular to interior surface 524 and exterior surface 526. In some embodiments, central longitudinal axis 511 extends through a center point of interior surface 524 and exterior surface 526. In some embodiments, container 500 further includes a flange 522 surrounding exterior surface 526.

In some embodiments, container 500 further includes a filling port 540 having an outer surface 547, an inner surface 548 defining a passageway in communication with interior volume 516, and configured to couple with a filling nozzle. In some embodiments, the nuclear waste material to be contained by container 500 is transferred into interior volume 516 through filling port 540 via the filling nozzle. In some embodiments, filling port 540 is configured to at least partially receive the filling nozzle therein. In some embodiments, inner surface 548 of filling port 540 is configured to form a tight seal with a filling nozzle so as to prevent nuclear waste material from exiting interior volume 516 between inner surface 548 of filling port 540 and the filling nozzle during filling of container 500.

Filling port 540 may extend from lid 520 as shown in the exemplary embodiment of FIGS. 5A and 6A. In some embodiments, filling port 540 may be integrally formed with lid 520. In other embodiments, filling port 540 is formed separately from lid 520 and secured thereto, for example, by welding. In some embodiments, filling port 540 is constructed from metal or metal alloy, and may be made from the same material as body 510 and/or lid 520.

Referring particularly to FIG. 6A, filling port 540 has a generally tubular configuration with inner surface 548 extending from first end 542 towards second end 543. According to some embodiments, filling port 540 extends from lid 520 along an axis 541 substantially parallel to central longitudinal axis 511. In some embodiments, inner surface 548 is radially disposed about axis 541. In some embodiments, first end 542 of filling port 540 defines an opening in lid 520 and has an internal diameter Df1. In some embodiments, second end 543 of filling port 540 has an internal diameter Df2 which may be different than diameter Df1. In some embodiments, Df2 is larger than Df1. In one embodiment, for example, Df1 is about 33 mm and Df2 is about 38 mm. In some embodiments, a stepped portion 549 is provided on the exterior of filling port 540. In some embodiments, stepped portion can be used for positioning an orbital welder (e.g., orbital welder 242 described herein below).

Container 500, in some embodiments, further includes a filling plug 550 configured to couple with filling port 540. In some embodiments, filling plug 550 is configured and dimensioned to be at least partially received in filling port 540 as generally shown in FIG. 6A. In some embodiments, filling plug 550 is radially disposed about axis 541 when coupled with filling port 540. In some embodiments, filling plug 550 is configured to close and seal filling port 540 to prevent material from exiting interior volume 516 via filling port 540.

Filling plug 550, in some embodiments, is configured to abut inner surface 548 when coupled to filling port 540. In some embodiments, filling plug 550 includes a portion having a diameter substantially equal to an internal diameter of filling port 540. In some embodiments, filling plug 550 includes a first portion 552 having a diameter substantially equal to Df1. In some embodiments, filling plug 550 alternatively or additionally includes a second portion 553 having a diameter substantially equal to Df2. In some embodiments, second portion 553 is configured to abut surface 544 when filling plug 550 is coupled with filling port 540. In some embodiments, filling plug 550 further abuts end surface 545 when filling plug 550 is coupled with filling port 540.

In some embodiments, filling plug 550 when coupled with filling port 540 creates a seam 546. In some embodiments, seam 546 is formed at an interface between filling plug 550 and end surface 545 of second end 543 of filling port 540. In some embodiments, seam 546 is located between external surface 551 of filling plug 550 and external surface 547 of filling port 540. In some embodiments, external surface 551 of filling plug 550 is substantially flush with external surface 547 of filling port 540 proximate seam 546. Seam 546 extends circumferentially around a portion of filling plug 550 according to some embodiments.

Filling port 540 and filling plug 550 may be secured together according to some embodiments by any suitable method known in the art. In some embodiments, filling plug 550 is threadably coupled with filling port 540. According to some of these embodiments, at least a portion of inner surface 548 is provided with internal threads that are configured to engage with external threads provided on at least a portion of filling plug 550 such that, for example, filling plug 550 may be screwed into filling port 540. In some embodiments, one or more of portions 552 and 553 may be provided with external threads that engage with internal threads provided on inner surface 548 of filling port 540. In other embodiments, filling port 540 and filling plug may be coupled via an interference or friction fit. In some embodiments, container 500 includes a gasket (not shown) positioned within filling port 540 to aid in sealing filling port 540 with filling plug 550. In some embodiments, a gasket is positioned between filling plug 550 and surface 544.

In some embodiments, filling port 540 and filling plug 550 may be permanently secured together after filling of container 500 with the nuclear waste material or other desired contents. In some embodiments, filling port 540 and filling plug 550 may be mechanically secured together. In some embodiments, filling port 540 may be fused with filling plug 550. In some embodiments, filling port 540 and filling plug 550 may be soldered or brazed together. In some embodiments, filling port 540 and filling plug 550 may be welded together along seam 546, for example, by orbital welding. In other embodiments, an adhesive or cement may be introduced into seam 546 to seal filling port 540 and filling plug 550 together.

In some embodiments, container 500 includes an evacuation port 560 having an outer surface 567 and an inner surface 568 defining a passageway in communication with interior volume 516. In some embodiments, evacuation port 560 is configured to allow venting of air or other gas from interior volume 516. In some embodiments, evacuation port 560 is configured to couple with an evacuation nozzle, as described further below, for evacuating air or other gas from interior volume 516. In some embodiments, the evacuation nozzle is connected with a ventilation or vacuum system capable of drawing air or other gas from interior volume 516 through evacuation port 560.

Evacuation port 560 may extend from lid 520 as shown in the exemplary embodiment of FIGS. 5A and 6A. In some embodiments, evacuation port 560 may be integrally formed with lid 520. In other embodiments, evacuation port 560 is formed separately from lid 520 and secured thereto, for example, by welding, soldering, brazing, or the like. In some embodiments, evacuation port 560 is constructed from metal or metal alloy, and may be made from the same material as body 510 and/or lid 520.

Referring particularly to FIG. 6A, evacuation port 560 has a generally tubular configuration with inner surface 568 extending from first end 562 towards second end 563. According to some embodiments, evacuation port 560 extends from lid 520 along an axis 561 substantially parallel to central longitudinal axis 511. In some embodiments, axis 561 is coplanar with central longitudinal axis 511 and axis 541 of filling port 540. In some embodiments, inner surface 568 is radially disposed about axis 561. In some embodiments, first end 562 of evacuation port 560 defines an opening in lid 520 and has an internal diameter $D_{e1}$. In some embodiments, second end 563 of evacuation port 560 has an internal diameter $D_{e2}$ which may be different than diameter $D_{e1}$. In some embodiments, $D_{e2}$ is larger than $D_{e1}$. In some embodiments, evacuation port 560 may further include one or more intermediate sections positioned between first end 562 and second end 563 defining internal diameters different than $D_{e1}$ and $D_{e2}$. In the exemplary embodiment shown in FIG. 6A, evacuation port 560 includes intermediate sections 564 and 565 respectively have internal diameters $D_{e3}$ and $D_{e4}$ and configured such that $D_{e1}<D_{e3}<D_{e4}<D_{e2}$. In some embodiments, evacuation port 560 has the same external diameter as filling port 540. In some embodiments, a stepped portion 569 is provided on the exterior of evacuation port 560. In some embodiments, stepped portion 569 can be used for positioning an orbital welder (e.g. orbital welder 242 described therein below). In some embodiments, stepped portion 569 can be used for positioning the evacuation nozzle.

According to some embodiments of the invention, evacuation port 560 is provided with a filter 590. In some embodiments, filter 590 is sized to span across the passageway defined by evacuation port 560. In some embodiments, filter 590 is positioned within evacuation port 560 at or proximate to first end 562 and has a diameter substantially equal to $D_{e1}$. In some embodiments, the filter 590 is sealingly engaged to inner surface 568 of evacuation port 560. In some embodiments, the filter 590 is secured to inner surface 568 of evacuation port 560, for example, via welding, soldering, brazing, or the like. In one embodiment, filter 590 is a high efficiency particulate air (HEPA) filter. In some embodiments, filter 590 is a single layer of material. In some embodiments, filter 590 is multi-layer material. In some embodiments, filter 590 is made from sintered material. In some embodiments, filter 590 is made from metal or metal alloy, for example, stainless steel, copper, aluminum, iron, titanium, tantalum, nickel, and alloys thereof. In some embodiments, filter 590 is made from a ceramic, for example, aluminum oxide ($Al_2O_3$) and zirconium oxide ($ZrO_2$). In some embodiments, filter 590 includes carbon or a carbon compound, for example, graphite. In some embodiments, the material of filter 590 is chosen so that upon heating the filter densifies into a solid and non-porous material. In some embodiments, the material of filter 590 is chosen wherein at a first temperature filter 590 is porous to air and/or gas but prevents passage of particles and at a second temperature filter 590 densifies into a non-porous material, wherein the second temperature is greater than the first temperature.

In some embodiments, filter 590 is configured to prevent passage of particles having a predetermined dimension through evacuation port 560 while allowing passage of air or other gas. In some embodiments, filter 590 is configured to prevent passage of particles having a dimension greater than 100 μm through evacuation port 560. In some embodiments, filter 590 is configured to prevent passage of particles having a dimension greater than 75 μm through evacuation port 560. In some embodiments, filter 590 is configured to prevent passage of particles having a dimension greater than 50 μm through evacuation port 560. In some embodiments, filter 590 is configured to prevent passage of particles having a dimension greater than 25 μm through evacuation port 560. In some embodiments, filter 590 is configured to prevent passage of particles having a dimension greater than 20 μm through evacuation port 560. In some embodiments, filter 590 is configured to prevent passage of particles having a dimension greater than 15 μm through evacuation port 560. In some embodiments, filter 590 is configured to prevent passage of particles having a dimension greater than 12 μm through evacuation port 560. In some embodiments, filter 590 is configured to prevent passage of particles having a dimension greater than 10 μm through evacuation port 560. In some embodiments, filter 590 is configured to prevent passage of particles having a dimension greater than 8 μm through evacuation port 560. In some embodiments, filter 590 is configured to prevent passage of particles having a dimension greater than 5 μm through evacuation port 560. In some embodiments, filter 590 is configured to prevent passage of particles having a dimension greater than 1 μm through evacuation port 560. In some embodiments, filter 590 is configured to prevent passage of particles having a dimension greater than 0.5 μm through evacuation port 560. In some embodiments, filter 590 is configured to prevent passage of particles having a dimension greater than 0.3 μm through evacuation port 560.

Container 500, in some embodiments, further includes an evacuation plug 570 configured to couple with evacuation port 560. In some embodiments, evacuation plug 570 is configured and dimensioned to be at least partially received in evacuation port 560 as generally shown in FIG. 6A. In some embodiments, evacuation plug 570 is radially disposed about axis 561 when coupled with filling port 560. In some embodiments, evacuation plug 570 is configured to allow air and/or other gas to pass through evacuation port 560 in a filling configuration and to close filling evacuation port 560 in a closed configuration to prevent air and/or other gas from passing through evacuation port 560.

In some embodiments, evacuation plug 570 includes a portion having a diameter substantially equal to or slightly less than an internal diameter of evacuation port 560. In some embodiments, evacuation plug 570 includes a first portion 572 having a diameter substantially equal to or slightly less than $D_{e1}$. In some embodiments, evacuation plug 570 alternatively or additionally includes a second portion 573 having a diameter substantially equal to $D_{e2}$. In some embodiments, evacuation plug 570 alternatively or additionally includes intermediate portions 574 and 575 having respective diameters substantially equal to or slightly less than $D_{e3}$ and $D_{e4}$.

In some embodiments, evacuation plug 570 when coupled with evacuation port 550 creates a seam 566. In some embodiments, seam 566 is formed at an interface between evacuation plug 570 and second end 563 of evacuation port 560. In some embodiments, seam 566 is located between external surface 571 of evacuation plug 570 and external surface 567 of evacuation port 560. In some embodiments, external surface 571 of evacuation plug 570 is substantially flush with external surface 567 of evacuation port 560 proximate seam 566. Seam 566 extends circumferentially around a portion of evacuation plug 570 according to some embodiments.

According to some embodiments of the invention, evacuation plug 570 is configured to be at least partially received within evacuation port 560 in a filling configuration such that air and/or other gas is allowed to exit from interior volume 516 of container 500 through filter 590 and through evacuation port 560 between inner surface 568 of evacuation port 560 and evacuation plug 570. In some embodiments, evacuation plug 570 and evacuation port 560 are coupled in the filling configuration such that a gap 582 of sufficient dimension to allow for air and/or other gas to pass there through is maintained between evacuation plug 570 and evacuation port 560 to provide a pathway for air and/or other gas to evacuated from interior volume 516. In some embodiments, gap 582 extends circumferentially around at least a portion of evacuation plug 570. In some embodiments, air and/or other gas is allowed to pass through gap 582 and through seam 566 in the filling configuration. In some embodiments, evacuation plug 570 and evacuation port 560 are coupled in the filling configuration such that a space 581 is maintained between evacuation plug 570 and filter 590. When present, space 581 should be of sufficient distance along the axial direction (e.g., along axis 561) to allow for air and/or other gas to pass through filter 590.

In some embodiments, container 500 is further configured to transition from the filling configuration to a closed configuration wherein the evacuation plug 570 is coupled with evacuation port 560 such that air and/or other gas is not allowed to pass through evacuation port 560. In some embodiments, evacuation port 560 is hermetically sealed by the evacuation plug 570 in the closed configuration. In some embodiments, the closed configuration allows a vacuum to be maintained in interior volume 516. In some embodiments, in the closed configuration, evacuation plug 570 is at least partially received within evacuation port 560 to close and seal the passageway defined by evacuation port 560 to prevent material from passing therethrough.

In some embodiments, a gasket 580 is provided between evacuation port 560 and evacuation plug 570. In some embodiments, gasket 580 aids in sealing the evacuation port 560 with the evacuation plug 570 in the closed configuration. Gasket 580, in some embodiments, surrounds at least a portion of evacuation plug 570. In the embodiment of FIG. 6A, gasket 580 is shown surrounding portion 575 of evacuation plug 570 and is positioned between and configured to abut second portion 573 of evacuation plug 570 and intermediate section 565 of evacuation port 560. In some embodiments, gasket 580 can be made from a metal or metal alloy, for example stainless steel, copper, aluminum, iron, titanium, tantalum, nickel, and alloys thereof. In some embodiments, gasket 580 is made from a ceramic, for example, aluminum oxide ($Al_2O_3$) and zirconium oxide ($ZrO_2$). In some embodiments, gasket 580 includes carbon or a carbon compound, for example, graphite.

In some embodiments, evacuation plug 570 is threadably coupled with evacuation port 560. According to some of these embodiments, at least a portion of inner surface 568 is provided with internal threads that are configured to engage with external threads provided on at least a portion of evacuation plug 570 such that, for example, evacuation plug 570 may be screwed into evacuation port 560. In some embodiments, one or more of portions 572, 573, 574, and 575 may be provided with external threads that engage with internal threads provided on inner surface 568 of evacuation port 560. In some embodiments, the filling configuration includes partially engaging the external threads of evacuation plug 570 with the internal threads of evacuation port 560 (e.g., partially screwing evacuation plug 570 into evacuation port 560) and the closed configuration includes fully engaging the external threads of evacuation plug 570 with the internal threads of evacuation port 560 (e.g., fully screwing evacuation plug 570 into evacuation port 560).

In some embodiments, evacuation port 560 and evacuation plug 570 may be permanently secured together. In some embodiments, evacuation port 560 and evacuation plug 570 may be mechanically secured together. In some embodiments, evacuation port 560 may be fused with evacuation plug 570. In some embodiments, evacuation port 560 and evacuation plug 570 may be soldered or brazed together. In some embodiments, evacuation port 560 and evacuation plug 570 may be welded together along seam 566, for example, by orbital welding. In such embodiments, the weld is placed between the evacuation port 560 and evacuation plug 570 away from the gasket 580 so not to disrupt the hermetic seal maintaining the atmosphere in the container 500. In other embodiments, an adhesive or cement may be introduced into seam 566 to seal evacuation port 560 and evacuation plug 550 together.

Referring to FIGS. 5A and 6A, container 500, in some embodiments, includes lifting member 530 which is configured to engage with a carrier for lifting and/or transporting container 500. Lifting member 530, according to some embodiments, is securely attached to and extends from exterior surface 526 of lid 520. In some embodiments, lifting member 530 is positioned centrally on exterior surface 526 of lid 520. In some embodiments, lifting member 530 is integrally formed with lid 520. In other embodiments, lifting member is formed separately from lid 520 and secured thereto, for example, by welding, soldering, brazing, or the like. In some embodiments, lifting member 530 is constructed from metal or metal alloy, and may be made from the same material as body 510 and/or lid 520.

In the exemplary embodiment shown, lifting member 530 includes a generally cylindrical projection 532 extending from lid 520 substantially co-axial with central longitudinal axis 511. In some embodiments, lifting member 530 is radially symmetric about central longitudinal axis 511. In some embodiments, lifting member 530 is positioned on lid 520 between filling port 540 and evacuation port 560. In some embodiments, lifting member 530 includes a groove 533 that extends at least partially around the circumference of projection 532. In further embodiments, lifting member 530 includes a flange 534 that partially defines groove 533.

Figure 6B:
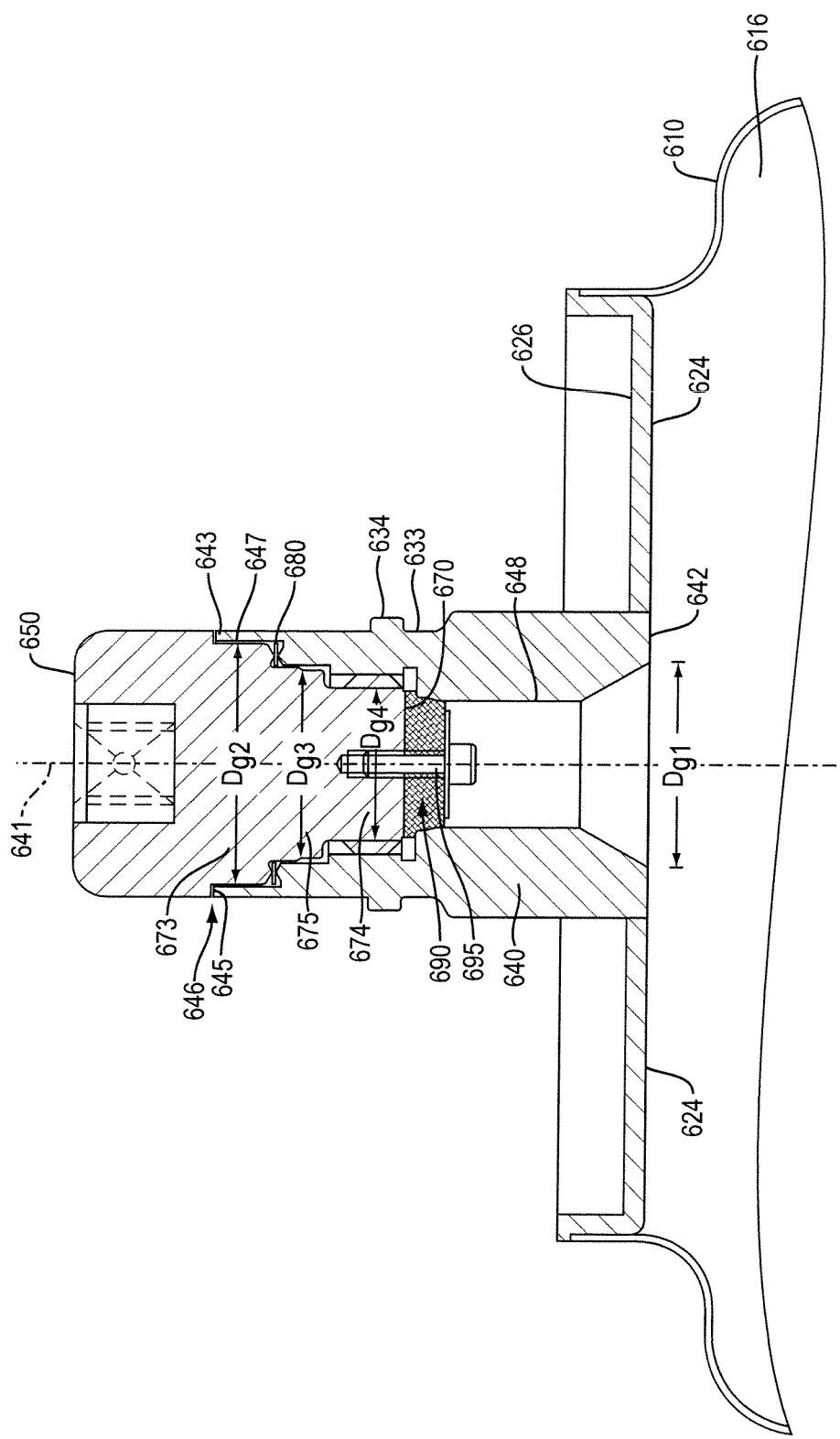
FIG. 6B is a side cross sectional view of a top portion of the container shown in FIG. 5B.

FIGS. 5B and 6B show another embodiment of a container, generally designated 600, for containment and storage of nuclear waste materials or other desired contents in accordance with an exemplary embodiment of the present invention. Container 600, in some embodiments, is particularly useful in hot isostatic pressing of waste materials. In some embodiments, body 610 is constructed of material capable of maintaining a vacuum within body 600.

According to some embodiments, container 600 generally includes body 610, lid 620, and filling port 640. In some embodiments, container 600 also includes filling plug 650 configured to engage with filling port 640.

Body 610 has a central longitudinal axis 611 and defines interior volume 616 for containing nuclear waste materials or other materials according to certain embodiments of the invention. In some embodiments, a vacuum can be applied to interior volume 616. In some embodiments, body 610 has a cylindrical or a generally cylindrical configuration having closed bottom end 615. In some embodiments, body 610 is substantially radially symmetric about central longitudinal axis 611. In some embodiments, body 610 may be configured to have the shape of any of the containers described in U.S. Pat. No. 5,248,453, which is incorporated herein by reference in its entirety. In some embodiments, body 610 is configured similarly to body 110 of container 100 shown in FIG. 1. Referring to FIG. 5B, in some embodiments body 610 has one or more sections 612 having a first diameter alternating along central longitudinal axis 611 with one or more sections 614 having a smaller second diameter. Body 610 may have the same configuration and dimensions described herein for body 510.

Body 610 may be constructed from any suitable material known in the art useful in hot isostatic pressing of nuclear waste materials. In some embodiments, body 610 is constructed from a material that is resistant to corrosion. In some embodiments, body 610 is made from a metal or metal alloy, for example, stainless steel, copper, aluminum, nickel, titanium, and alloys thereof.

In some embodiments, container 600 includes a lid 620 opposite closed bottom end 615, Lid 620, in some embodiments, is integrally formed with body 610. In other embodiments, lid 620 is formed separately from body 610 and secured thereto, for example, via welding, soldering, brazing, fusing or other known techniques in the art to form a hermetic seal circumferentially around lid 620. In some embodiments, lid 620 is permanently secured to body 610. Referring to FIG. 6B, lid 620 includes interior surface 624 facing interior volume 616 and exterior surface 626 opposite interior surface 624. In some embodiments, central longitudinal axis 611 is substantially perpendicular to interior surface 624 and exterior surface 626. In some embodiments, central longitudinal axis 611 extends through a center point of interior surface 624 and exterior surface 626. In some embodiments, container 600 further includes a flange 622 surrounding exterior surface 626.

In some embodiments, container 600 further includes a filling port 640 having an outer surface, a stepwise inner surface 647 and a lower inner surface 648 defining a passageway in communication with interior volume 616, and configured to couple with a filling nozzle. In some embodiments, the nuclear waste material to be contained by container 600 is transferred into interior volume 616 through filling port 640 via the filling nozzle. In some embodiments, filling port 640 is configured to at least partially receive the filling nozzle therein. In some embodiments, stepwise inner surface 647 and/or lower inner surface 648 of filling port 640 is configured to form a tight seal with a filling nozzle so as to prevent nuclear waste material from exiting interior volume 616 between stepwise inner surface 647 and lower inner surface 648 of filling port 640 and the filling nozzle during filling of container 600.

Filling port 640 may extend from lid 620 as shown in the exemplary embodiment of FIGS. 5B and 6B. In some embodiments, filling port 640 may be integrally formed with lid 620. In other embodiments, filling port 640 is formed separately from lid 620 and secured thereto, for example, by welding. In some embodiments, filling port 640 is constructed from metal or metal alloy, and may be made from the same material as body 610 and/or lid 620.

Referring particularly to FIG. 6B, filling port 640 has a generally step wise tubular configuration with stepwise inner surface 647 and lower inner surface 648 extending from first end 642 towards second end 643. According to some embodiments, filling port 640 extends from lid 620 along an axis 641 substantially coaxial to central longitudinal axis 611. In some embodiments, stepwise inner surface 647 is radially disposed about axis 641. In some embodiments, lower inner surface 648 is radially disposed about axis 641. In some embodiments, first end 642 of filling port 640 defines an opening in lid 620 and has an internal diameter $D_{g1}$. In some embodiments, second end 643 of filling port 640 has an internal diameter $D_{g2}$ which may be different than diameter $D_{g1}$. In some embodiments, $D_{g2}$ is larger than $D_{g1}$.

In some embodiments, filling port 640 is provided with a flange 634 at least partially defining a groove 633. In some embodiments, flange 634 and groove 633 extend circumferentially around filling port 640. In some embodiments, flange 634 and groove 633 are radially symmetric about axis 641. In some embodiments, flange 634 and/or groove 633 are configured to engage with a carrier for lifting or transporting container 600.

Container 600, in some embodiments, further includes a filling plug 650 configured to couple with filling port 640. In some embodiments, filling plug 650 is configured and dimensioned to be at least partially received in filling port 640 as generally shown in FIG. 6B. In some embodiments, filling plug 650 is radially disposed about axis 641 when coupled with filling port 640. In some embodiments, filling plug 650 is configured to close and seal filling port 640 to prevent material from exiting interior volume 616 via filling port 640. In some embodiments, filling plug 650 is configured for hermetically sealing filling port 640.

Filling plug 650, in some embodiments, is configured to abut stepwise inner surface 647 when coupled to filling port 640. In some embodiments, filling plug 650 includes a first portion 673 having a diameter substantially equal to $D_{g2}$. In some embodiments, filling plug 650 alternatively or additionally includes a second portion 675 having a diameter substantially equal to $D_{g3}$. In some embodiments, filling plug 650 alternatively or additionally includes a third portion 674 having a diameter substantially equal to $D_{g4}$. In some embodiments, first portion 673 is configured to abut surface 649 when filling plug 650 is coupled with filling port 640.

In some embodiments, filling plug 650 when coupled with filling port 640 creates a seam 646. In some embodiments, seam 646 is formed at an interface between filling plug 650 and end surface 645 of second end 643 of filling port 640. In some embodiments, seam 646 is located between an external surface of filling plug 650 and an external surface of filling port 640. In some embodiments, the external surface of filling plug 650 is substantially flush with the external surface of filling port 640 proximate seam 646.

Seam 646 extends circumferentially around a portion of filling plug 650 according to some embodiments.

Filling port 640 and filling plug 650 may be secured together according to some embodiments by any suitable method known in the art. In some embodiments, filling plug 650 is threadably coupled with filling port 640. According to some of these embodiments, at least a portion of inner surface 648 is provided with internal threads that are configured to engage with external threads provided on at least a portion of filling plug 650 such that, for example, filling plug 650 may be screwed into filling port 640. In some embodiments, one or more of portions 652 and 653 may be provided with external threads that engage with internal threads provided on inner surface 648 of filling port 640. In other embodiments, filling port 640 and filling plug may be coupled via an interference or friction fit.

In some embodiments, a gasket 680 is provided between filling port 640 and filling plug 650. In some embodiments, gasket 680 aids in sealing the filling port 640 with the filling plug 650 in a closed configuration. Gasket 680, in some embodiments, surrounds at least a portion of filling plug 650. In the embodiment of FIG. 6B, gasket 680 is shown surrounding portion 675 of filling plug 650 and is positioned between and configured to abut portion 673 of filling plug 650 and filling port 640. In some embodiments, gasket 680 can be made from a metal or metal alloy, for example stainless steel, copper, aluminum, iron, titanium, tantalum, nickel, and alloys thereof. In some embodiments, gasket 680 is made from a ceramic, for example, aluminum oxide ($Al_2O_3$) and zirconium oxide ($ZrO_2$). In some embodiments, gasket 680 includes carbon or a carbon compound, for example, graphite.

In some embodiments, filling port 640 and filling plug 650 may be permanently secured together after filling of container 600 with the nuclear waste material or other desired contents. In some embodiments, filling port 640 and filling plug 650 may be mechanically secured together. In some embodiments, filling port 640 may be fused with filling plug 650. In some embodiments, filling port 640 and filling plug 650 may be soldered or brazed together. In some embodiments, filling port 640 and filling plug 650 are configured to provide a hermetic seal. In some embodiments, filling port 640 and filling plug 650 may be welded together along seam 646, for example, by orbital welding. In such embodiments, the weld is placed between the filling plug 650 and filling port 640 away from the gasket 680 so as not to disrupt the hermetic seal maintaining the atmosphere in the container 600. In other embodiments, an adhesive or cement may be introduced into seam 646 to seal filling port 640 and filling plug 650 together.

According to some embodiments of the invention, filling plug 650 is provided with a filter 690. In some embodiments, filter 690 is sized to span the circular end section 670 of filling port 650. In some embodiments, the filter 690 is sealingly engaged to circular end section 670 of filling plug 650. In some embodiments, the filter 690 is secured to circular end section 670 of filling plug 650, for example, via welding, soldering, brazing, or the like. In some embodiments, filter 690 is secured to filling plug 650 with a mechanical fastener 695, such as a screw, nail, bolt, staple, or the like. In one embodiment, filter 690 is a high efficiency particulate air (HEPA) filter. In some embodiments, filter 690 is a single layer of material. In some embodiments, filter 690 is multi-layer material. In some embodiments, filter 690 is made from sintered material. In some embodiments, filter 690 is made from metal or metal alloy, for example, stainless steel, copper, aluminum, iron, titanium, tantalum, nickel, and alloys thereof. In some embodiments, filter 690 is made from a ceramic, for example, aluminum oxide ($Al_2O_3$), aluminosilicates (eg. $Al_2SiO_5$) and zirconium oxide ($ZrO_2$). In some embodiments, filter 690 includes carbon or a carbon compound, for example, graphite. In some embodiments, the material of filter 690 is chosen so that upon heating the filter densifies into a solid and non-porous material. In some embodiments, the material of filter 690 is chosen wherein at a first temperature filter 690 is porous to air and/or gas but prevents passage of particles and at a second temperature filter 690 densifies into a non-porous material, wherein the second temperature is greater than the first temperature.

In some embodiments, filter 690 is configured to prevent passage of particles having a predetermined dimension through filling port 640 while allowing passage of air or other gas when filling plug 650 is coupled with filling port 640. In some embodiments, filter 690 is configured to prevent passage of particles having a dimension greater than 100 μm through filling port 640. In some embodiments, filter 690 is configured to prevent passage of particles having a dimension greater than 75 μm through filling port 640. In some embodiments, filter 690 is configured to prevent passage of particles having a dimension greater than 50 μm through filling port 640. In some embodiments, filter 690 is configured to prevent passage of particles having a dimension greater than 25 μm through filling port 640. In some embodiments, filter 690 is configured to prevent passage of particles having a dimension greater than 20 μm through filling port 640. In some embodiments, filter 690 is configured to prevent passage of particles having a dimension greater than 15 μm through filling port 640. In some embodiments, filter 690 is configured to prevent passage of particles having a dimension greater than 12 μm through filling port 640. In some embodiments, filter 690 is configured to prevent passage of particles having a dimension greater than 10 μm through filling port 640. In some embodiments, filter 690 is configured to prevent passage of particles having a dimension greater than 8 μm through filling port 640. In some embodiments, filter 690 is configured to prevent passage of particles having a dimension greater than 5 μm through filling port 640. In some embodiments, filter 690 is configured to prevent passage of particles having a dimension greater than 1 μm through filling port 640. In some embodiments, filter 690 is configured to prevent passage of particles having a dimension greater than 0.5 μm through filling port 640. In some embodiments, filter 690 is configured to prevent passage of particles having a dimension greater than 0.3 μm through filling port 640.

According to some embodiments of the invention, filling plug 650 is configured to be at least partially received within filling port 640 in a filling configuration such that air and/or other gas is allowed to exit from interior volume 616 of container 600 through filter 690 and between stepwise inner surface 647 of filling port 640 and filling plug 650. In some embodiments, filling plug 650 and filling port 640 are coupled in the filling configuration such that a gap (not shown) of sufficient dimension to provide a pathway for air and/or other gas to evacuated from interior volume 616. In some embodiments, the gap extends circumferentially around at least a portion of filling plug 650. In some embodiments, air and/or other gas is allowed to pass through the gap and through seam 646 in the filling configuration.

In operation, the interior volume of a container 216 is filled with material by coupling a filling port 540 to a filling nozzle 260 wherein container 216 is place under a negative pressure prior to filling or container 216 is simultaneously evacuated during the filling process according to some embodiments. In some embodiments, the filling port 540 is configured to tightly fit around the filling nozzle 260 to prevent material from exiting container 216 between the filling port 540 and the filling nozzle 260. In some embodiments, the filling of container 216 continues until the desired amount of material has been added to container 216. In some embodiments, a predetermined volume of material is added to container 216. In some embodiments, a predetermined weight of material is added to container 216.

With reference to FIG. 6A, material to be stored (e.g., nuclear waste or calcined material) is added to interior volume 516 of container 500 via a filling nozzle 260 coupled to filling port 540 according to some embodiments. In some embodiments, the filling port 540 is configured to tightly fit around filling nozzle 260 to prevent material from exiting container 500 between the filling port 540 and filling nozzle 260. In some embodiments, as container 516 is being filled, air and/or other gas contained in interior volume 516 is evacuated from container 500 via evacuation port 560 provided with filter 590. In some embodiments, filter 590 prevents all or at least most non-gaseous materials from exiting container 500 through evacuation port 560 while the air and/or other gas is being evacuated from interior volume 516. In some embodiments, filter 590 is configured to prevent particles having a diameter of at least 10 µm from exiting interior volume 516 through evacuation port 560 during filling of waste material and air/gas evacuation. Evacuation of the air and/or other gas, in some embodiments, can be facilitated by coupling evacuation port 560 with an evacuation nozzle 300. Evacuation nozzle 300 may be coupled with an evacuation line or system (e.g., a vacuum source). In some embodiments, the evacuation line is operated at vacuum levels of about 25 to about 500 millitorr.

After filling container 500 with the desired amount of material, filling nozzle 260 is replaced with filling plug 550 to close and seal filling port 540. In some embodiments, filling port 540 is hermetically sealed with filling plug 550. In some embodiments, filling plug 550 is welded to filling port 540. In some embodiments, an orbital welder 242 is used to weld filling plug 550 to filling port 540.

In some embodiments, evacuation port 560 may be provided with evacuation plug 570. As previously described, evacuation plug 570 may be threadably coupled with evacuation port 560 in a first open configuration to allow air and/or other gas to pass through filter 590 and between evacuation plug 570 and evacuation port 560 and in a second closed configuration to hermetically seal and close evacuation port 560. In some embodiments, after filling is complete, evacuation port 560 is closed by evacuation plug 570. In some embodiments, evacuation port 560 is closed while evacuation nozzle 300 is coupled to evacuation port 560.

With reference to FIG. 6B, container 600 is evacuated by coupling filling port 640 with an evacuation line or system (e.g., a vacuum source). Material is then added to interior volume 616 of container 600 via a filling nozzle 260 coupled to filling port 640. In some embodiments, the filling port 640 is configured to tightly fit around filling nozzle 260 to prevent material from exiting container 600 between the filling port 640 and filling nozzle 260. In some embodiments, container 600 is evacuated to a pressure of about 750 millitorr to about 1000 millitorr prior to filling.

After filling container 600 with the desired amount of material, filling nozzle 260 is replaced with filling plug 650 to close and seal filling port 640 according to some embodiments. In some embodiments, container 600 is returned to the atmospheric pressure (e.g. the pressure of first cell 217) after filling.

FIGS. 8-11 illustrate an exemplary filling system 299 for transferring hazardous waste material into a container 216 in accordance with various embodiments of the present invention. Filling system 299, in accordance with some embodiments of the present invention, is designed to prevent contamination of equipment and container exterior and elimination of secondary waste. The design features include, but are not limited to: container structure to allow container filling under vacuum; weight verification system and/or volume verification system; and filling nozzle structure. As illustrated, in FIGS. 8-10, in some embodiments, system 299 for transferring hazardous waste material into a sealable container 216 includes a filling nozzle 260, at least one hopper 214, a pneumatic cylinder 285, a seal 284, a vibrator 281, a lift mechanism 282, a damper 283, a first scale 277, a second scale 278 and a processor 280.

Figure 8:
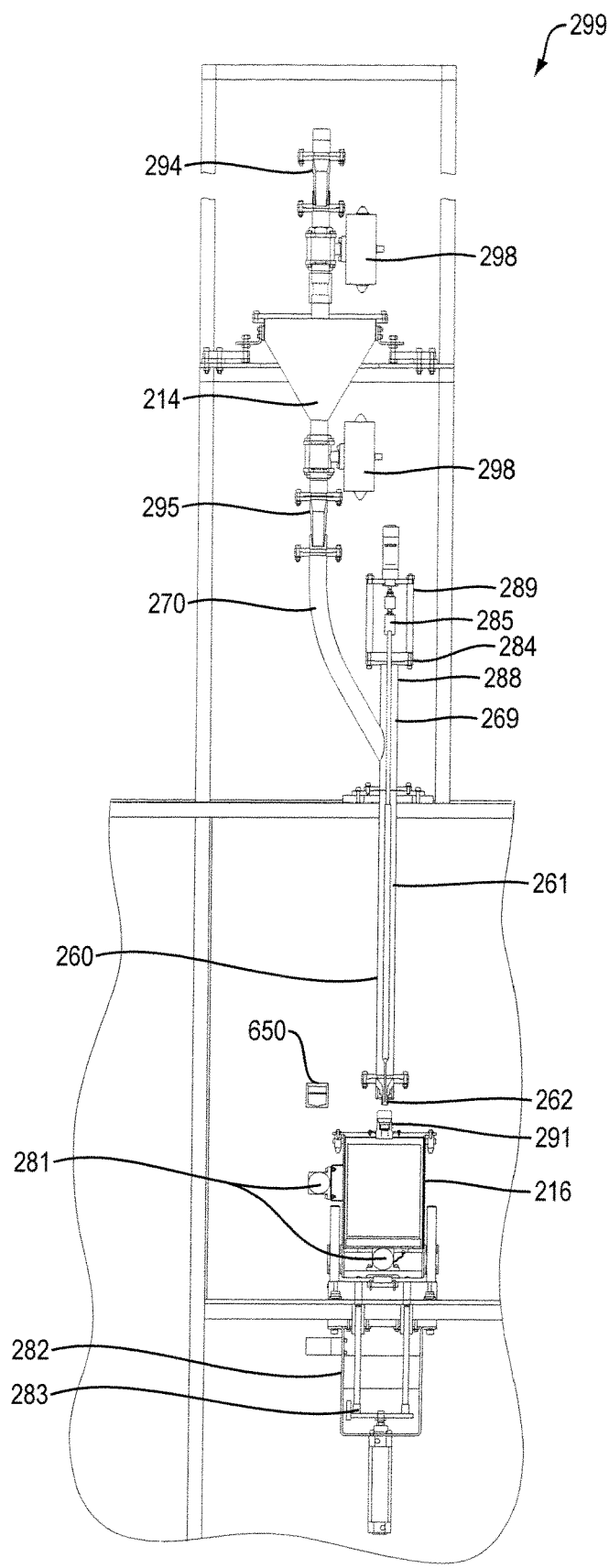
FIG. 8 is a partial cross sectional view of a filling system for use within the first cell of FIG. 7 shown with the single port container of FIG. 5B.
Figure 9:
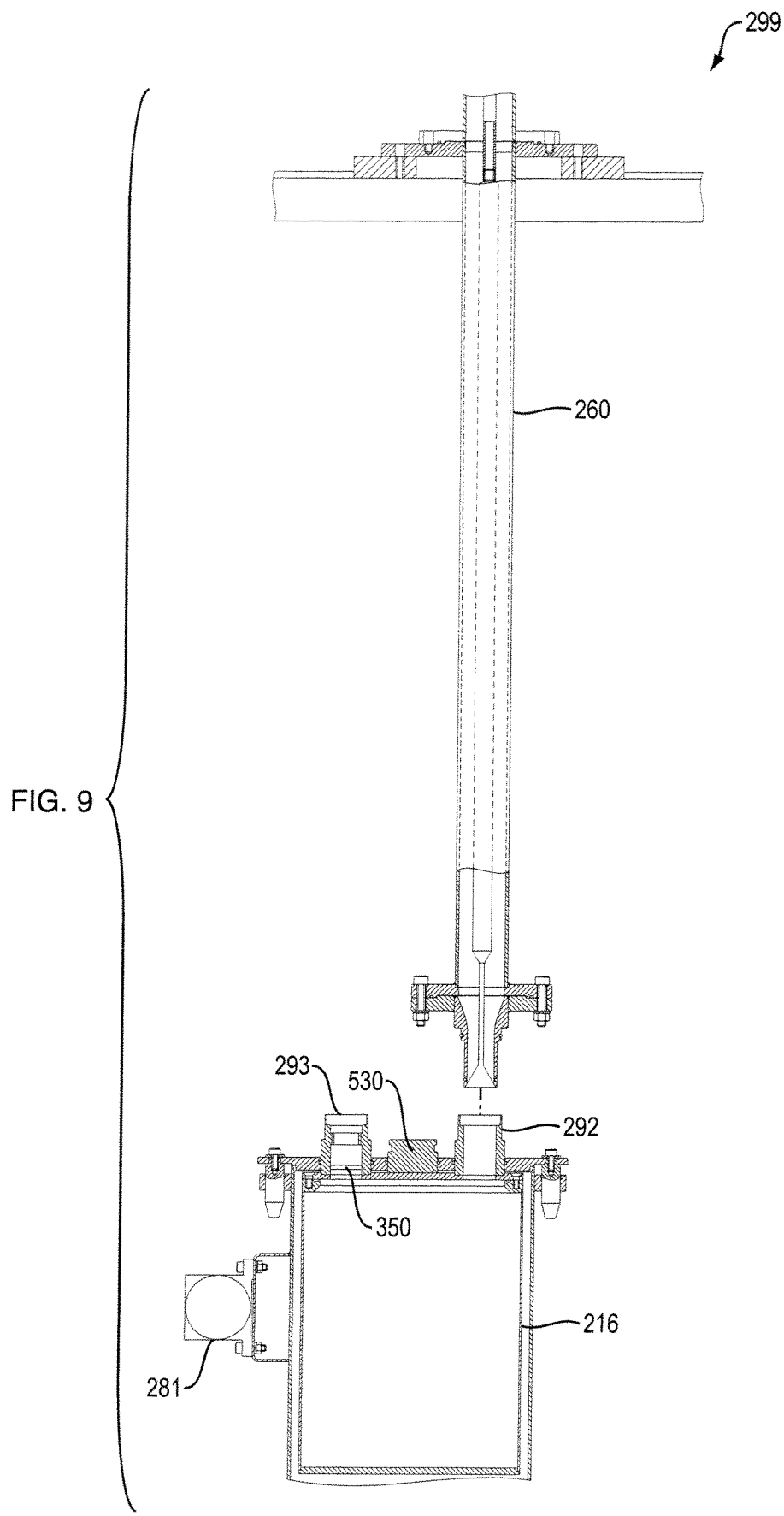
FIG. 9 is a partial cross sectional view of a filling system for use within the first cell of FIG. 7 shown with the dual port container of FIG. 5A.

The system of FIGS. 8-11 may be used with a container having a single port, such as container 600, or a container having two ports, such as container 500, as described above herein. FIG. 8 illustrates a filling nozzle 260 relative to an exemplary container 216 having a single port 291. FIG. 9 illustrates a filling nozzle 260 relative to an exemplary container 216 having two ports, a filling port 292 and an evacuation port 293. In some embodiments, filling port 292 and evacuation port 293 may have the configuration of filling port 540 and evacuation port 560 of container 500 illustrated in FIGS. 5A and 6A. In one embodiment, the evacuation port 293 includes a filter 350. In some embodiments, filter 350 prevents the escape of hazardous waste particles from the container. Exemplary filter materials are discussed above herein. In some embodiments, filter 350 has the configuration of filter 590 as described above herein. In some embodiments, the transfer of hazardous waste is performed to prevent overpressure of container 216. In some embodiments, container 216 is at least initially under negative pressure before transfer of hazardous waste begins. In other embodiments, container 216 is under negative pressure simultaneously with the transfer of hazardous waste. In yet other embodiments, container 216 is initially under negative pressure before the filling process begins and is intermittently placed under negative pressure with the transfer of hazardous waste. In another embodiment, filling port 292 of container 216 is configured to be sealed closed after decoupling valve body 261 from filling port 292.

In some embodiments, container 216 is filled at about 25° C. to about 35° C. In other embodiments, container 216 is filled at a temperature up to 100° C.

Figure 11:
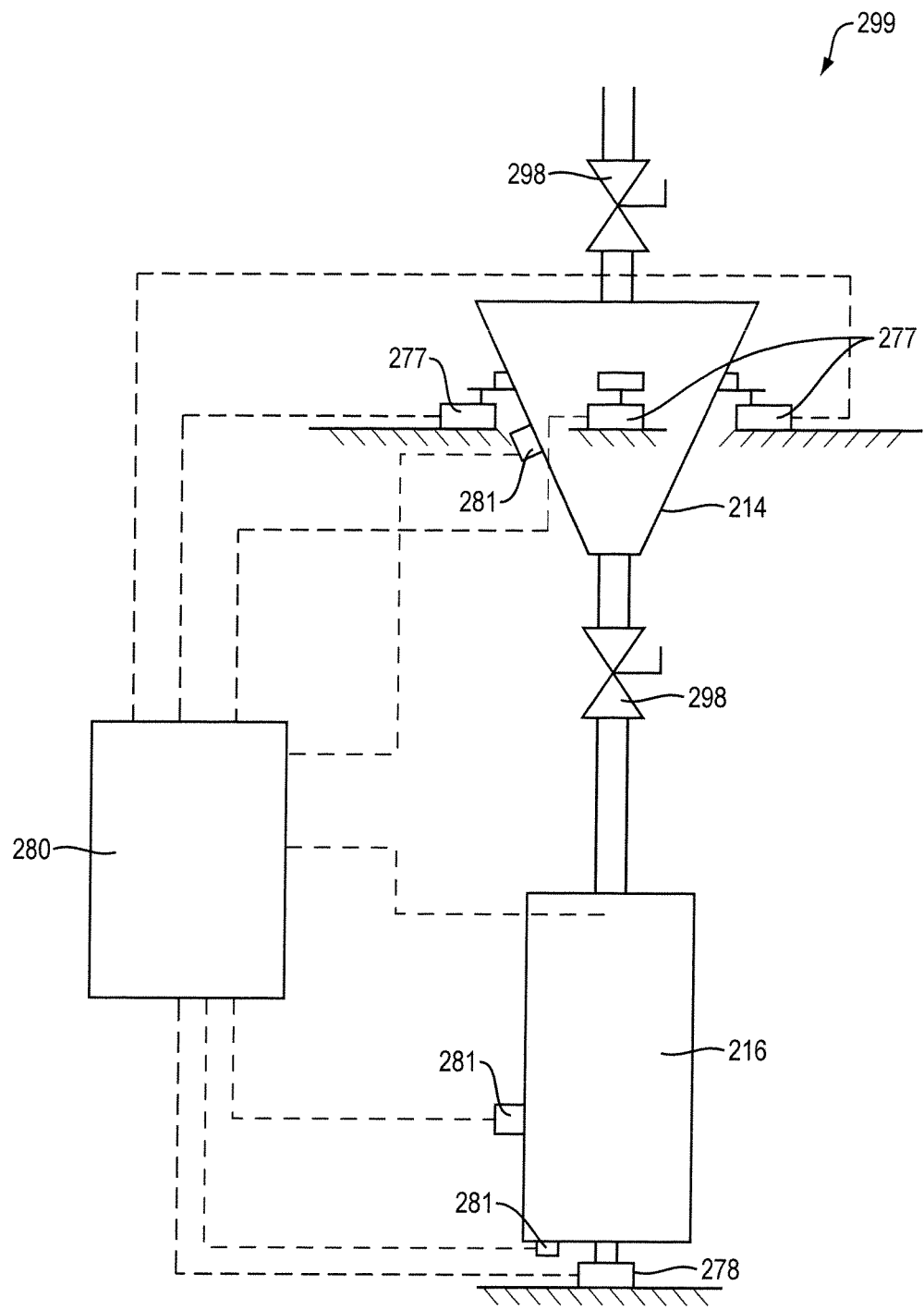
FIG. 11 is a schematic diagram of a filling-weigh system in accordance with an exemplary embodiment of the present invention.

Referring to FIGS. 2 and 11, in one embodiment, additive from the additive feed hopper 210 is added to the feed blender 212. In one such embodiment, the amount of additive is metered using an additive feed screw (not shown). Feed blender 212 is actuated to mix the calcined material with the additive. In one embodiment, feed blender 212 is a mechanical paddle-type mixer with the motor drives external to the cell. Referring to FIG. 8, in one embodiment a rotary airlock or ball valve 298, located between the feed blender 212 and hopper 214, transfers the mixed calcined material to feed hopper 214. In another embodiment, a rotary air lock or ball valve 298 is positioned between feed hopper 214 and container 216 to control transfer of material therebetween.

Referring to FIG. 7, in some embodiments, a fixed volume of the mixed calcined material is transferred from feed hopper 214 to container 216 which is located in first cell 217. In one embodiment, container 216 has two ports, a fill and an evacuation port, as described herein. In another embodiment, container 216 has a single port as described herein.

Fill port 540, 640, attached to the top of container 216, is mated to a fill nozzle, discussed below herein, that is designed to eliminate spilling any of the hazardous material on the exterior of container 216. In one embodiment, fill nozzle 260 and fill port 540, 640 are configured to prevent contamination with waste material of the seal between a filling plug 550 and the interior of fill port 540, 640.

In one embodiment, the amount of hazardous material transferred to a container is carefully controlled to ensure that container 216 is substantially full without overfilling container 216. In some embodiments, a weight verification system connected to hopper 214 and container 216 ensures that the proper amount of material is transferred. In some embodiments, equal volumes between hopper and container in combination with weight verification system connected to hopper 214 and container 216 ensure that the proper amount of material is transferred. In some embodiments, the weight verification system includes a processor 280 and a plurality of weigh scales 277. In some embodiments, a first scale 277 is coupled to the hopper 214 and configured to determine an initial hopper weight; a second scale 278 is coupled to the container 216 and configured to determine a container fill weight; and a processor 280 is coupled to the first scale 277 and the second scale 278 and configured to compare the initial hopper weight to the container fill weight. In some embodiments, initial hopper weight is the weight between flange 294 and flange 295 including hopper 214. In some embodiments, initial hopper weight means the weight of hazardous material within the hopper prior to filling container 216. In some embodiments, container fill weight means the weight of hazardous material in container 216 during the filling process and/or at the end of the filling process. In one embodiment, hopper 214 includes a volume substantially equal to a volume of container 216.

In some embodiments, one or more vibrators 281 are provided to one or more components of filling system 299 to help ensure that all of the material is transferred from hopper 214 to container 216. In some embodiments, one or more vibrators 281 are configured to apply a vibrating force to one or more components of system 299 in order to assist in transferring the material to container 216. In some embodiments, vibrators 281 are configured to provide at least a force in a vertical direction. In some embodiments, vibrators 281 are configured to provide at least a force in a lateral direction. In one embodiment, at least one vibrator 281 is coupled to hopper 214, for example, to shake material from hopper 214 to container 216. In one embodiment, at least one vibrator 281 is coupled to a bottom of container 216. In one such embodiment, vibrator 281 coupled to bottom of container 216 is configured to provide vibration to container 216 in at least a vertical direction. In one embodiment, at least one vibrator 281 is coupled to a sidewall of the container 216. In one such embodiment, vibrator 281 coupled to the sidewall of container 216 is configured to provide vibration to container 216 in at least a lateral direction. The one or more vibrators 281, in some embodiments, are coupled a processor configured to control activation and/or operation (e.g., frequency) of vibrators 281. In some embodiments, processor 280 is coupled to the one or more vibrators 281. In some embodiments, one or more vibrators 281 are activated if container 216 is determined to be under-filled, for example, where the material to be transferred has been held up inside the system. In one embodiment, one or more vibrators 281 are activated if the container fill weight is less than the initial hopper weight.

Figure 10:
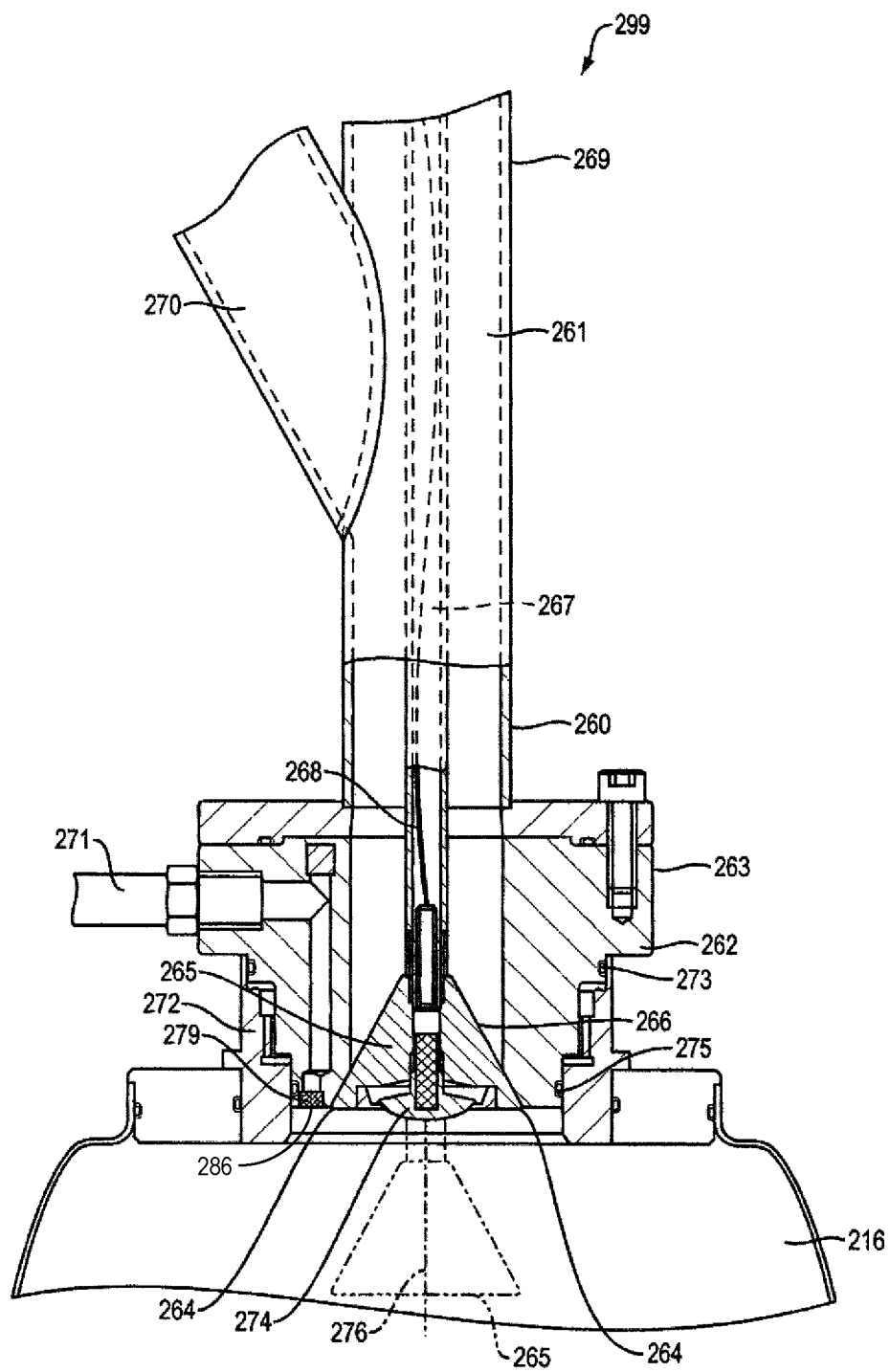
FIG. 10 is a partial cross sectional view of a filling nozzle in accordance with an exemplary embodiment of the present invention.

Referring to FIGS. 8 and 10, in one embodiment, filling nozzle 260 includes a valve body 261, a valve head 265 and a valve stem 267. Valve body 261 includes a distal end 262 and an outer surface 263, valve body 261 including a valve seat 264 proximate distal end 262, outer surface 263 proximate distal end 262 configured to sealingly and removeably couple valve body 261 to a filling port 272 of a container 216. In certain embodiments, valve body 261 includes a first branch section 270 configured to couple to hopper 214. In one embodiment, a second branch section 269 includes the distal end 262 of the filling nozzle 260 and has a proximal end 288. In one embodiment, the proximal end 288 is coupled to a drive mechanism 289 configured to move the valve stem 267. In one embodiment, valve head 265 includes a valve face 266 configured to form a seal with the valve seat 264 in a closed configuration. In one embodiment, valve head 265 is configured to allow valve body 261 and container 216 to be fluidly coupled with one another in an open configuration. In certain embodiments, valve head 265 extends distally from valve body 261 and into container 216 in the open configuration. Valve stem 267 extends co-axially with axis 276 from valve head 265 through at least a portion of valve body 261. In a further embodiment, valve stem 267 extends through proximal end 288 of second branch section 269, proximal end 288 including a seal 284 coupled to a portion of valve stem 267.

In some embodiments, filling nozzle 260 is sealed with filling port 272 of container 216 to prevent spilling of the hazardous waste material from container 216. In one embodiment, filling nozzle 260 extends into filling port 272 to prevent waste material from interfering with the seal between a filling plug (e.g. filling plug 650) and filling port 272 after removing filling nozzle 260. In some embodiments, outer surface 263 of distal end 262 includes at least one seal 273 to form a seal with filling port 272. In another embodiment, at least one seal 273 includes at least one o-ring. In one embodiment, at least one seal 273 includes two o-ring seals. In some embodiments, outer surface 263 includes a second seal 275 to form a seal with filling port 272. In some embodiments, filling port 272 has the configuration of filling port 640 of container 600, and at least one of seals 273 and 275 engages with lower inner surface 648 to form a seal therewith. In some embodiments, at least one of seals 273 and 275 engages with lower inner surface 648 at a position between first end 642 and where filter 690 engages filling port 640 as shown in FIG. 6B. In some embodiments, at least one of seals 273 and 275 engages with stepwise inner surface 647 at a position between first end 642 and gasket 680.

In one embodiment, filling nozzle 260 further includes a sensor 274 disposed in valve head 265. In one embodiment, sensor 274 is configured to determine a level of hazardous material in container 216. In one embodiment, sensor 274 extends distally from valve body 261. In another embodiment, sensor 274 is coupled to a wire 268 that extends through valve stem 267. In one embodiment, sensor 274 is coupled to a wire 268 that extends through valve stem 267. Suitable sensors may include contact type sensors including displacement transducer or force transducer. In such embodiments, a displacement transducer senses filling powder height. In such embodiments, a force transducer includes a stain gauge on thin membrane that is deflected by the filling powder front. Suitable sensors may also include non contact type sensors including sonar, ultrasonic, and microwave. In one embodiment, a drive mechanism operates valve stem 267. In one embodiment, drive mechanism 289 includes a pneumatic cylinder 285. In some embodiments, a lift mechanism 282 is configured to lift container 216 toward filling nozzle 262. In one embodiment, lift mechanism 282 includes at least one damper 283.

In one embodiment, the system for transferring hazardous waste material into the sealable container further comprises a vacuum nozzle 271 configured to be in fluid communication with container 216. In one embodiment, vacuum nozzle 271 extends through distal end 262 of valve body 261. In another embodiment, vacuum nozzle 271 includes a filter 279 proximate the distal end 262 of valve body 261. In certain embodiments, the system in accordance with the present invention further comprises a vacuum nozzle 271 sealingly and removeably couplable with the exhaust port 286, vacuum nozzle 271 being in sealed fluid communication with the valve body 261 in a filling configuration.

In one embodiment, first cell 217 does not exchange air with subsequent cells while at least container 216 is being filled by the filling system 299. Referring to FIG. 7, in one embodiment, first cell 217 includes an off-gas sub-system 206 coupled to filling system 299 wherein off-gas sub-system 206 has a vacuum nozzle configured to couple to container 216.

Figure 12:
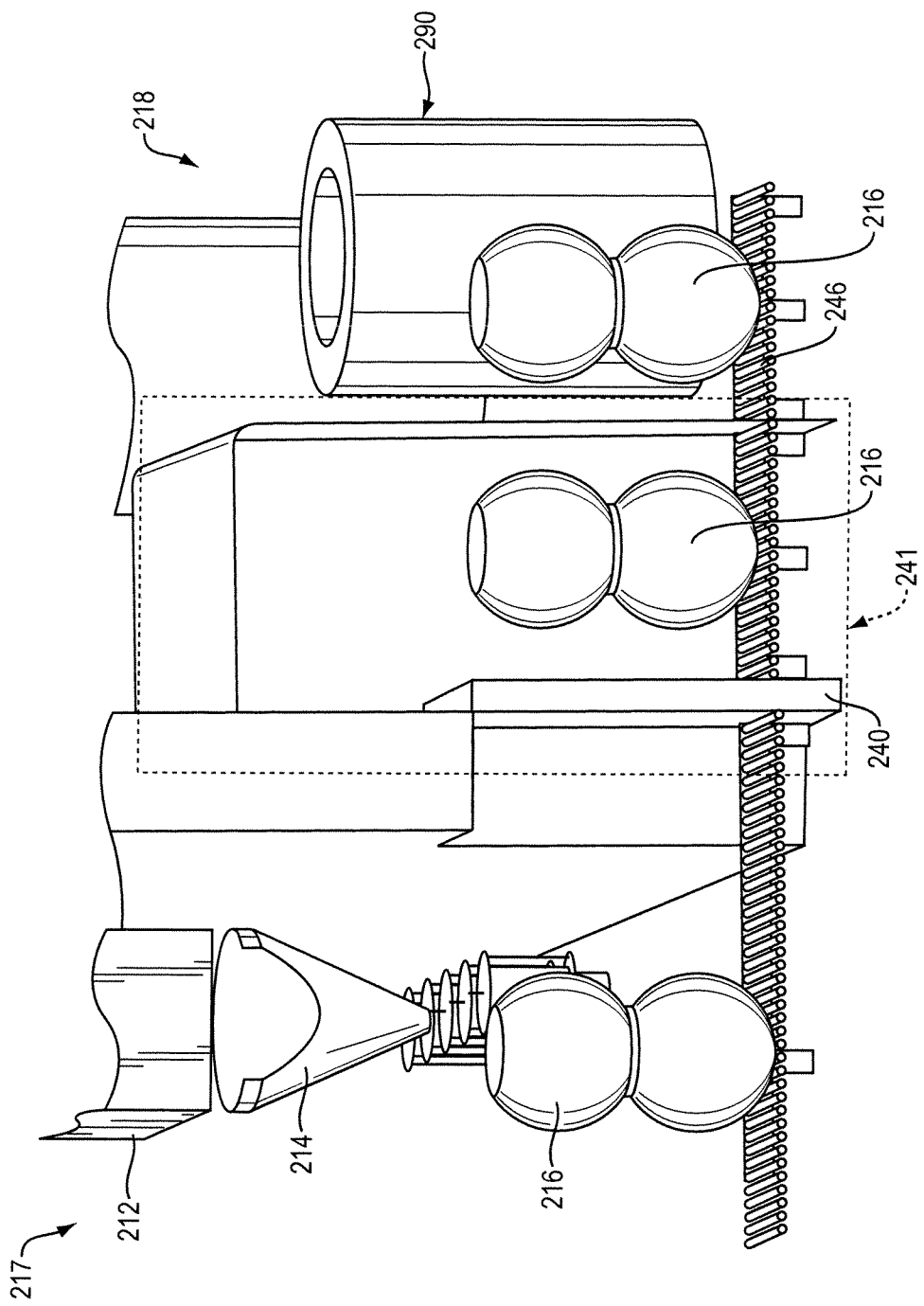
FIG. 12 is a partial side perspective schematic diagram of the first and second cells of FIG. 3.

Referring to FIG. 12, in a further embodiment, first cell 217 is coupled to the second, subsequent cell 218 with one or more sealable doors 240. In one embodiment, the second, subsequent cell 218 is a bake-out and vacuum sealing cell. In one embodiment, first cell 217 is coupled to second cell 218 via an air interlock 241. In one embodiment, air interlock 241 is configured to allow container 216 to be transferred from first cell 217 to second cell 218.

II. Second Cell

Exemplary embodiments of second cell 218 and certain components thereof are illustrated in FIGS. 2, 3, 4, 12, 13, 14 and 16. In one embodiment, second cell 218 is a bake-out and vacuum sealing cell which allows for heating and evacuating container 216 followed by sealing of container 216. In one embodiment, first cell 217 is held at a first pressure P1 and second cell 218 is held at a second pressure P1, where the first pressure P1 is less than the second pressure P2. First cell 217 and second cell 218 are interconnected via the sealable door 240 according to some embodiments.

Figure 16:
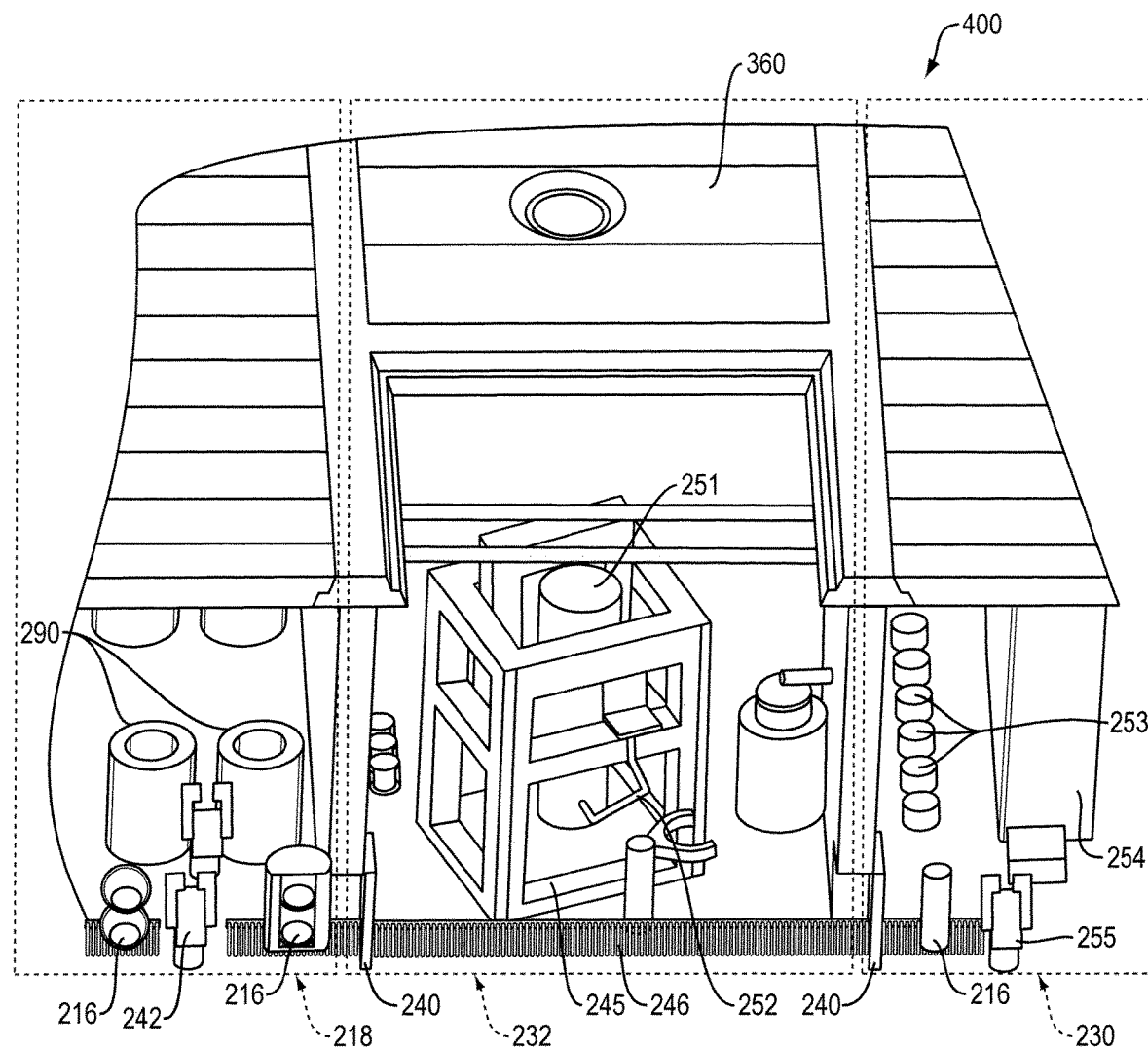
FIG. 16 is a top perspective view of a third cell of the exemplary modular system of FIGS. 3 and 4 with the top and side walls partially removed.

In one embodiment, second cell 218 includes a baking and sealing station 243. In certain embodiments, second cell 218 further includes a welding station. Referring to FIG. 2, in one embodiment, second cell 218 includes a bake-out furnace 290, an off-gas system 206 having a vacuum nozzle configured to couple to the container 216. In some embodiments, as shown in FIG. 16, second cell 218 further includes an orbital welder 242 configured to apply a weld to container 216.

In one embodiment, referring to FIGS. 3 and 12, second cell 218 includes an interlock 241, interlock 241 coupling first cell 217 to second cell 218 and configured to allow container 216 to be transferred from first cell 217 to second cell 218 while maintaining at least one seal between the first cell 217 and second cell 218. In one embodiment, interlock 241 includes decontamination equipment. In another embodiment, first cell 217 and interlock 241 may be communicatively interconnected via sealable door 240, allowing container 216 to be transferred from first cell 217 to interlock 241. In a further embodiment, first cell 217 and second cell 218 include a roller conveyer 246 configured to allow containers 216 to be loaded thereon and transported within and/or between each cell.

Referring again to FIG. 2, in some embodiments, second cell 218 includes a furnace 290 configured for heating container 216 in a bake-out process. In some embodiments, the bake-out process includes heating container 216 in furnace 290 to remove excess water and/or other materials, for example, at a temperature of about 400° C. to about 500° C. for several hours. In some embodiments, a vacuum is established on container 216 and any off-gas is removed from container 216 during the bake-out process. The off-gas may include air from container 216 and/or other gas released from the waste material during the bake-out process. In some embodiments, the off-gas removed from container 216 is routed through line 206, which may lead out of second cell 218 and may be connected to a further ventilation system. Line 206, in some embodiments, includes one or more filters 204 to capture particulates entrained in the off-gas. Filters 204 may include HEPA filters according to some embodiments. In further embodiments, line 206 includes one or more traps 219 for removing materials such as mercury that may not be desirable to vent. For example, trap 219 in one embodiment may include a sulfur impregnated carbon bed trap configured to trap mercury contained in the off-gas from container 216. In further embodiments, a vacuum is established in container 216 during the bake-out process and container 216 may then be sealed to maintain the vacuum.

Figure 13:
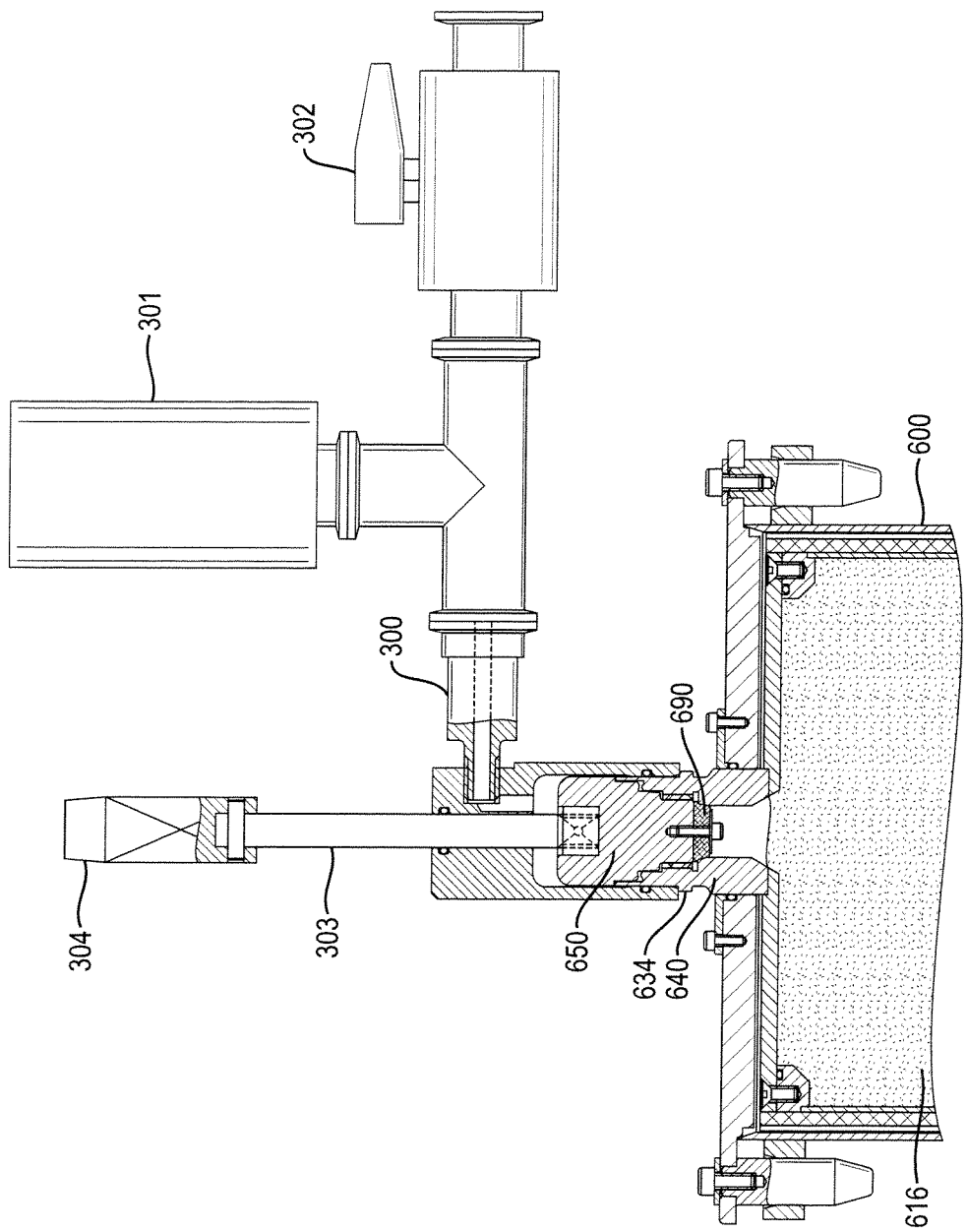
FIG. 13 is a partial side cross sectional view of a vacuum nozzle coupled to the container shown in FIG. 5B.

Evacuation of the air and/or other gas from container 216, in some embodiments, is achieved by coupling container 216 with an evacuation system. FIG. 13 illustrates an exemplary evacuation system that can be used in accordance with embodiments of the invention shown coupled to filling plug 640 of container 600 as described above herein. It should be understood that the evacuation system depicted in FIG. 13, in other embodiments, may be coupled to containers having other configurations. For example, the evacuation system may be coupled to evacuation port 560 of container 500 shown in FIGS. 5A and 6A.

Referring again to FIG. 13, the evacuation system shown includes an evacuation nozzle 300, which may be coupled with an evacuation line or other a vacuum source. In some embodiments, evacuation nozzle 300 is further coupled to a vacuum transducer 301 configured to measure the vacuum level in container 600. In some embodiments, evacuation nozzle 300 is coupled to a valve 302. In some embodiments, valve 302 is configured to isolate container 600 from the vacuum source, which in turn allows for the detection of leaks in container 600 or detection of gas being evolved from interior volume 616. The detection can be accomplished, for example, by measuring pressure change (e.g. using vacuum transducer 301) as a function of time. An increase in pressure (or loss of vacuum) in container 600 over time may indicate, for example, a possible leak or gas generation from interior volume 616. In some embodiments, evacuation nozzle 300 further includes a filter configured to prevent passage of particulate matter there through.

As illustrated, evacuation nozzle 300 in some embodiments is coupled to filling plug 650 and/or filling port 640 of container 600. In some embodiments, evacuation nozzle 300 fits around filling plug 650 and filling port 640. In some embodiments, evacuation nozzle 300 is configured to at least partially surround filling plug 650 and filling port 640 when filling plug 650 is coupled with filling port 640. In some embodiments, evacuation nozzle 300 forms a circumferential seal with filling port 640 when coupled thereto. In some embodiments, evacuation nozzle 300 seats against flange 634. In some embodiments, evacuation nozzle 300 includes a gasket that engages with an external surface of filling port 640 to form a hermitic seal therewith when evacuation nozzle is coupled with filling port 640.

In some embodiments, filling plug 650 may be threadably coupled with filling port 640 in a first open configuration to allow air and/or other gas to pass through filter 690 and between filling plug 650 and filling port 640 and in a second closed configuration to hermetically seal and close filling port 640. In some embodiments, air and/or other gas is allowed to pass between filling plug 650 and filling port 640 and through seam 646. In some embodiments, evacuation nozzle 300 is configured to withdraw air and/or other gas from interior volume 616 of container 600 when filling plug 650 and filling port 640 are in the first open configuration. In some embodiments, after air and/or other gas is withdrawn from interior volume 616, a vacuum is created within interior volume 616 and filling plug 650 is used to hermetically seal filling port 640 in the closed configuration so as to maintain the vacuum.

In some embodiments evacuation nozzle 300 is fitted with a torque 304 having a stem 303. In some embodiments, stem 303 has a proximal end and a distal end, said distal end being configure to mate with a recess in filling plug 650, and the proximal end being coupled to a handle. In some embodiments, the handle of torque 304 is manipulated to threadably tighten filling plug 650 to filling port 640, thereby forming a tight seal between the filing plug 650 and filling port 640. In some embodiments, torque 304 is manipulated with a drive shaft.

Figure 14:
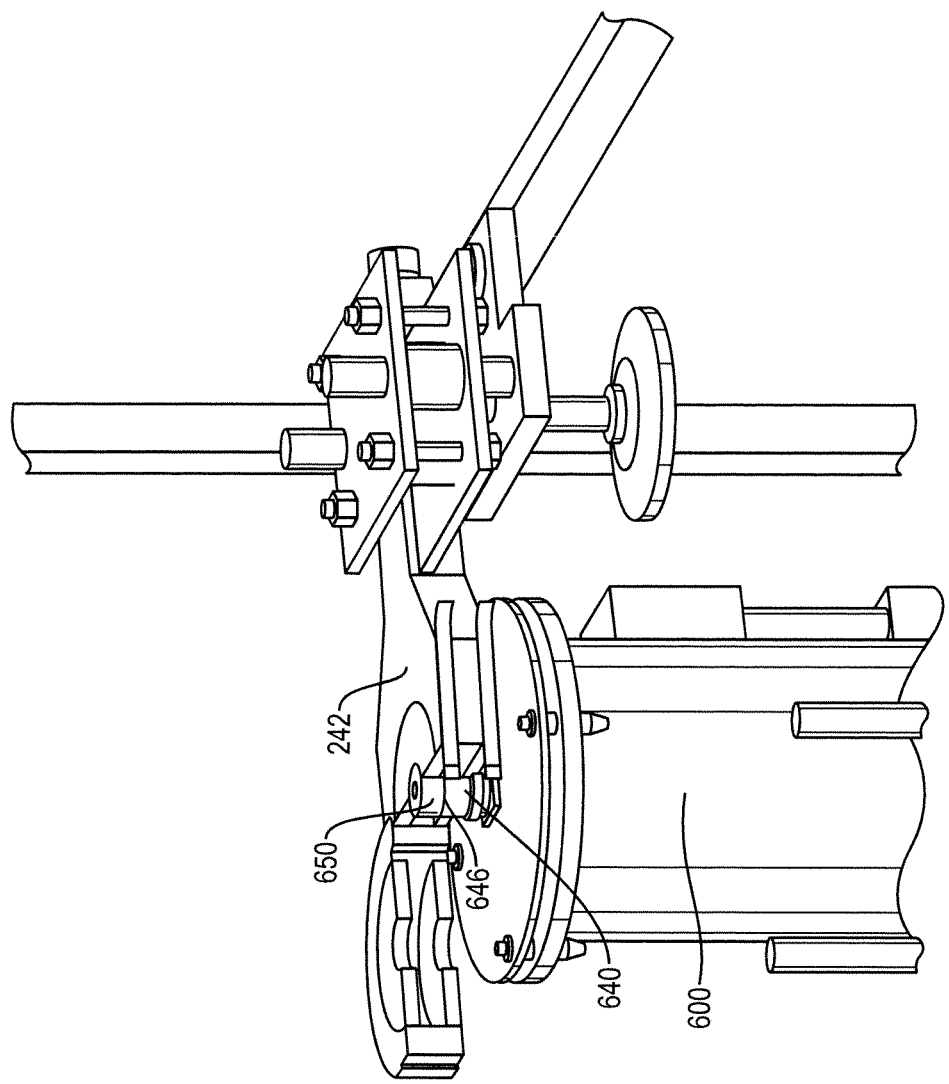
FIG. 14 is a perspective view of an orbital welder in use with the container shown in FIG. 5B.

In some embodiments, when the bake-out process is completed, the vacuum is maintained on container 600 through the evacuation system. In some embodiments, when the vacuum reaches a set point, the vacuum is verified, for example using vacuum transducer 301 as described above herein, and filling port 640 is closed (e.g., hermetically sealed) by filling plug 650 and the evacuation system is removed. In some embodiments, filling plug 650 is then welded to filling port 640. In some embodiments, filling plug 650 is welded to filling port 640 by an orbital welder 242, which may be positioned in a welding station in second cell 218. An embodiment of an orbital welding station is illustrated in FIG. 14, which shows orbital welder 242 configured to weld filling plug 650 onto filling port 640 of container 600 at seam 646. In some embodiments, orbital welder 242 is remotely operated. In some embodiments, welds applied by orbital welder 242 are visually inspected.

While the foregoing description of the evacuation system and orbital welder 242 makes reference to container 600, it should be understood that these elements may be similarly used on other configurations for container 216. For example, in other embodiments, these elements may be similarly used to evacuate, seal, and weld container 500 at evacuation port 560. In these embodiments, where container 500 also includes a separate filling port 540, filling port 540 may be similarly closed (e.g., by filling plug 550) and welded sealed by orbital welder 242 prior to the bake-out process.

With reference again to FIG. 2, following the bake-out process, container 216, in some embodiments, is placed in containment 231 after being removed from furnace 290. In some embodiments, containment 231 provides for further contamination control in case of leakage or rupture of container 216. In some embodiments, containment 231 may be pre-staged on roller conveyor 246 for subsequent transport to third cell 232.

III. Third Cell

Figure 15:
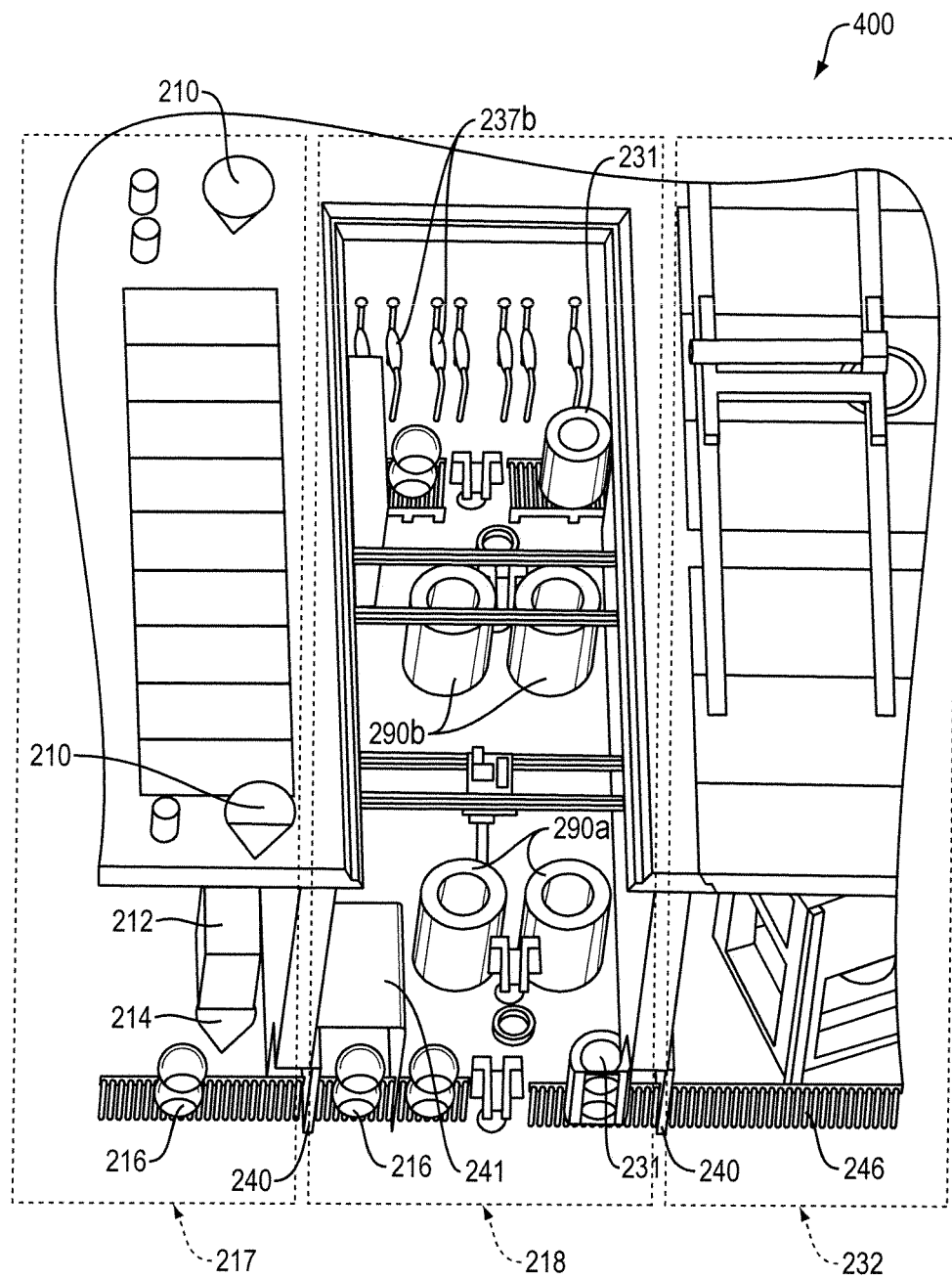
FIG. 15 is a top perspective view of a second cell of the exemplary modular system of FIGS. 3 and 4 with the top and side walls partially removed.

Exemplary embodiments of third cell 232 are illustrated in FIGS. 3, 4 and 15. In one embodiment, third cell 232 is a HIP process cell which allows for hot isostatic pressing of container 216. In one embodiment, third cell 232 includes a hot isostatic pressing station. In one embodiment, first cell 217 is held at a first pressure P1, second cell 218 is held at a second pressure P2 and third cell 232 is held at a third pressure P3. In one embodiment, first pressure P1 is less than second pressure P2 which is less than third pressure P3.

Referring to FIGS. 3, 4 and 16, in one embodiment, modular system 400 in accordance with the present invention includes third cell 232, wherein third cell 232 is isolated from first cell 217 and second cell 218, and wherein second cell 218 and third cell 232 are configured to allow container 216 to be transferred from second cell 218 to third cell 232. In some embodiments, container 216 is transferred from second cell 218 to third cell 232 in containment 231. In some embodiments, container 216 is subjected to hot isostatic pressing in third cell 232. In some embodiments, container 216 is subjected to hot isostatic pressing while in containment 231. In some embodiments, third cell 232 includes a hot isostatic pressing station 249. In one embodiment, hot isostatic pressing station 249 includes a HIP support frame 245, a hot isostatic pressing vessel 251 secured to support frame 245, and a pedestal mounted pick and place machine (robotic arm) 252 secured to the HIP support frame 245, robotic arm 252 configured to manipulate within hot isostatic pressing station 249. In one embodiment, robotic arm 252 is configured to lift and transfer container 216 from roller conveyer 246 into isostatic process vessel 251.

In a further embodiment, third cell 232 includes a sealable door 240. In one embodiment, sealable door 240 couples third 232 and second cell 218 and is configured to allow container 216 to be transferred from second cell 218 to third cell 232. In a further embodiment, second cell 218 and third cell 232 each include a roller conveyer 246 configured to allow container 216 to be loaded thereon and transported within and/or between second 218 and third cell 232.

Hot isostatic pressing, according to some embodiments, includes positioning containment 231 holding container 216 in a hot isostatic pressing vessel 251. In some embodiments, container 231 is positioned by robotic arms 252. In some embodiments, the hot isostatic pressing vessel 251 is provided with an argon atmosphere (e.g., from argon source 236 via argon line 202) which can be heated and pressurized. In some embodiments, for example, the hot isostatic pressing process is performed by heating containment 231 holding container 216 to about 1000° C. to about 1250° C. in the hot isostatic pressing vessel 251 for about 2 hours to about 6 hours. In some embodiments, the pressure inside the hot isostatic pressing vessel 251 is controlled to be about 4300 psi to about 15000 psi during the hot isostatic pressing process. In some embodiments, compressors (e.g., 234) protected by in-line filtration are used to control the argon atmosphere of the hot isostatic pressing vessel 251. In some embodiments, the argon used during the hot isostatic pressing process is filtered and stored in a manner that conserves both argon and pressure. Referring to FIG. 2, in some embodiments, the argon is recycled to argon source 236 via pump 238. The recycled argon, in some embodiments, passes through filter 233.

With reference to container embodiments illustrated in FIGS. 5A, 5B, 6A and 6B, the material of filter 590 and/or filter 690 is chosen so that upon heating during hot isostatic pressing the filter densifies into a solid and non-porous material forming a weld with container, container evacuation port and/or container filling port. In some embodiments, the material of filter 590 and/or 690 is chosen wherein at a filling temperature filter 590 and/or 690 is porous to air and/or gas but densifies into a non-porous material during hot isostatic pressing.

In some embodiments, after hot isostatic pressing is complete, containment 231 and container 216 is allowed to cool within the hot isostatic pressing vessel 251 to a temperature sufficient for removal (e.g., about 600 EC). In some embodiments, hot isostatic isostatic pressing vessel 251 includes a cooling jacket having cooling fluid (e.g., water) flowing therethrough. In some embodiments, the cooling jacket is supplied with cooling water at a rate of about 80 gpm to about 100 gpm.

In some embodiments, containment 231 holding container 216 is removed from hot isostatic pressing vessel 251 and transferred to a cooling cabinet for cooling. In some embodiments, the cooling cabinet is supplied with a cooling fluid (e.g., water). In some embodiments, the cooling cabinet is supplied with cooling water at a rate of about 10 gpm. In some embodiments, containment 231 and container 216 are allowed to cool in the cooling cabinet for about 12 hours. Following cooling in the cooling cabinet, containment 231 holding container 216 is placed on a roller conveyor 246 for transport to fourth cell 230.

IV. Fourth Cell

Figure 17:
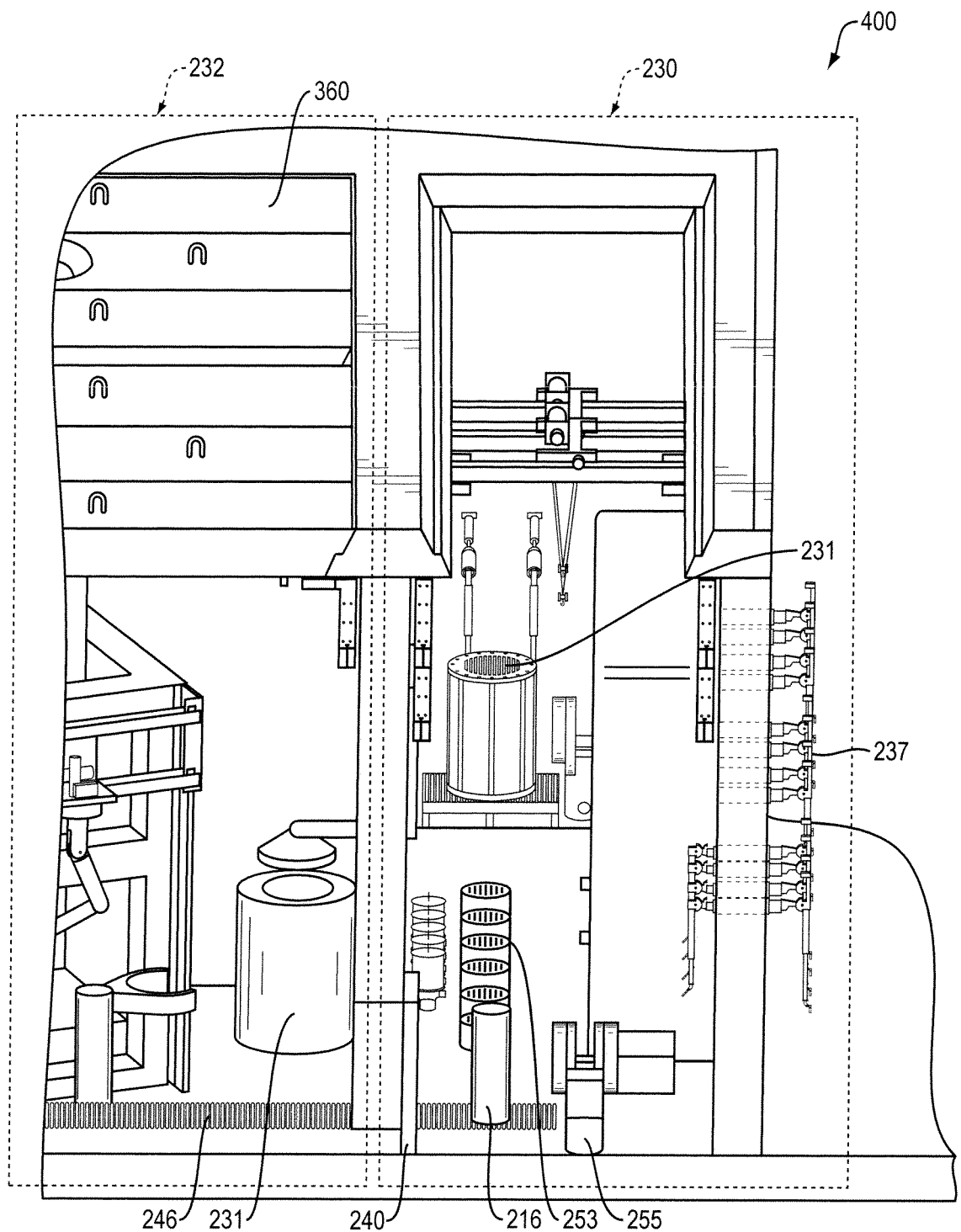
FIG. 17 is a side perspective view of a fourth cell of the exemplary modular system of FIGS. 3 and 4 with the top and side walls partially removed.

Exemplary embodiments of fourth cell 230 are illustrated in FIGS. 3, 4 and 17. In one embodiment, fourth cell 230 is a cooling cell which allows for further cooling of container 216 after the hot isostatic pressing (HIP) process. In some embodiments, container 216 is packaged in fourth cell 230 for subsequent storage.

In a further embodiment, referring to FIGS. 3, 4 and 17, modular system 400 in accordance with the present invention includes fourth cell 230, which may be a cooling cell. In one embodiment, fourth cell 230 is isolated from first 217, second cell 218 and third cell 220. In one embodiment, third 232 and fourth cell 230 are configured to allow container 216 to be transferred from third cell 232 to fourth cell 230. In one embodiment, first cell 217 is held at a first pressure P1, bake-out and second cell 218 is held at a second pressure P2, third cell 232 is held at a third pressure P3 and fourth cell 230 is held at a fourth pressure P4. In one embodiment, first pressure P1 is less than second pressure P2 which is less than third pressure P3 which is less than fourth pressure P4.

In a further embodiment, fourth cell 230 includes a moveable shielded isolation door 240. In one embodiment, sealable door 240 is coupled to fourth cell 230 and third cell 232 and is configured to allow container 216 to be transferred from third cell 232 to fourth cell 230. In a further embodiment, each of third cell 232 and fourth cell 230 includes a roller conveyer 246 configured to allow container 216 to be loaded thereon and transported within and/or between third cell 232 and fourth cell 230. In yet another embodiment, fourth cell 230 includes an orbital welder 255.

In some embodiments, after transport to fourth cell 230, containment 231 is opened and container 216 checked for evidence of container failure (e.g., deformation, expansion, breakage, etc.). In the event of failure of container 216, according to some embodiments, container 216 and containment 231 are moved to a decontamination chamber within fourth cell 230, decontaminated and returned to second cell 218 for possible recovery. If there is no evidence of failure of container 216, container 216 is removed from containment 231 and transferred to a cooling and packing station 250 in fourth cell 230 according to some embodiments. In a further embodiment, cooling and packing station 250 includes a set of at least one or more cooling stations. In one embodiment, at least one or more cooling stations 253 configured to receive and hold processed container 216 for final cooling. In some embodiments, container 216 is passively cooled in cooling station 253. In some embodiments, container 216 is actively cooled in cooling station 253.

In some embodiments, after final cooling, container 216 is packaged in fourth cell 230 for transport and storage. In some embodiments, one or more cooled containers 216 are placed in a canister. In some embodiments, the canister containing one or more containers 216 is then welded shut, for example, using an orbital welder 255. In some embodiments, the canister can then be transported for storage.

Referring to FIG. 2, any one of the cells of the modular system 400 may include any suitable number of vacuum lines, including no vacuum line at all. As illustrated in FIG. 2, first cell 217, second cell 218, third cell 232 and fourth cell 230 may each include a set of one or more vacuum lines. Moreover, as illustrated in FIGS. 2, 3, 4, 5 and 10, first cell 217, second cell 218, third cell 232 and fourth cell 230 may each be equipped with a set of at least one or more remotely operated overhead bridge cranes 239. In one embodiment, in addition to their material handling roles, each of these remotely operated overhead bridge cranes 239 are designed to be available for use in accomplishing either remote or manned maintenance of the equipment within the various cells. In another embodiment, each of the in-cell cranes may be configured to be capable of being remotely removed from the cell via a larger crane provided for maintenance purposes.

In some embodiments, secondary waste produced by modular system 400 of the present invention may be collected and transferred to containers 216 for processing in accordance with steps of process flow 200. In some embodiments, for example, secondary waste is added to feed blender 212, mixed with calcined materials and/or additives, and transferred to a container 216 via a filling nozzle for subsequent hot isostatic pressing. Secondary waste, as used herein according to certain embodiments, refers to hazardous waste materials which are removed from container 216 and/or materials which are contaminated with hazardous waste materials during steps of the present invention. In some embodiments, the secondary waste is converted to a form suitable for transferring via the filling nozzle before introducing the secondary waste into a container 216.

In some embodiments, secondary waste includes materials filtered or trapped from the off gases evacuated from container 216. In one such embodiment, secondary waste includes mercury captured from off gas evacuated from a container 216 during processing, for example, by one or more traps 219 as described above herein. The mercury may be transformed into an amalgam by mixing the mercury with one or more other metals and transferred to another container 216 for further processing according to one example of this embodiment.

In some embodiments, secondary waste further includes system components which may have been contaminated by or in direct contact with hazardous waste material. The contaminated components may be combusted, crushed, pulverized, and/or treated in another manner prior to feeding to a container 216. In one such example, secondary waste includes a used cell or exhaust line filter (e.g., filter 204), which may contain hazardous waste materials. In some embodiments, the used filter may be combusted and the resulting ashes are fed to a container 216 for further processing.

In some embodiments, at least 50% by weight of the secondary waste produced by modular system 400 is collected for processing. In some embodiments, at least 60% by weight of the secondary waste produced by modular system 400 is collected for processing. In some embodiments, at least 70% by weight of the secondary waste produced by modular system 400 is collected for processing. In some embodiments, at least 80% by weight of the secondary waste produced by modular system 400 is collected for processing.

In some embodiments, at least 90% by weight of the secondary waste produced by modular system 400 is collected for processing. In some embodiments, at least 95% by weight of the secondary waste produced by modular system 400 is collected for processing. In some embodiments, at least 99% by weight of the secondary waste produced by modular system 400 is collected for processing.

Method of Processing Hazardous Waste Using a Modular System

In some embodiments, the systems, method and components described herein provide for a method of storing hazardous waste material comprising a plurality of steps and performed in a modular system. In some embodiments, one or more of the steps described herein can be performed in an automated manner. In a first cell, hazardous waste material is added to a container via a filling nozzle coupled to a filling port of the container. Various embodiments of such filling nozzle are described herein. The container is configured to sealingly contain the hazardous waste material. In one embodiment, the container further includes an evacuation port. In one embodiment, the container is evacuated prior to adding the hazardous waste material by connecting a filling nozzle having a connector coupled to a vacuum system to thereby place the container under a negative pressure. In another embodiment, the container is evacuated during adding of the hazardous waste material via an evacuation nozzle coupled to an evacuation port of the container to thereby maintain the container under a negative pressure during the adding step. In some embodiments, the amount of hazardous waste material added to the container is verified by measuring the weight of the container after filling. Various embodiments of weight verification systems are described herein. In some embodiments, the amount of hazardous waste material added to the container is verified by comparing the weight (or change in weight) of the container after filling to the weight of hazardous waste material prior to filling. In one embodiment, a filling plug is inserted into the filling port to form a plugged container after the hazardous waste material is added to the container to close the filling port. In another embodiment, a filling plug is inserted into the filling port and an evacuation plug is inserted into the evacuation port prior to sealing the filling port to form a plugged container.

The plugged container is then transferred from the first cell to the second cell via the moveable shielded isolation door. In one embodiment, the plugged cell is transferred from the first cell to the second cell via the moveable shielded isolation door and then into an interlock area containing contamination equipment.

In the second cell, the plugged container is connected to an evacuation nozzle coupled to an evacuation system and the container is heated. In some embodiments, the container is heated in a bake-out furnace to remove excess water and/or other materials. In some embodiments, off-gas including air and/or other gas is removed from container during heating, for example, through the use of the evacuation nozzle. In one embodiment, the evacuation nozzle is coupled to the evacuation port of the container. In such an embodiment, the evacuation plug is closed while the evacuation nozzle is couple to the evacuation nozzle. In one such embodiment, the evacuation port includes an evacuation plug which is threadably coupled to the evacuation port. The evacuation plug allows air and/or gas to pass through a filter, located in the evacuation plug, and between the evacuation plug and the evacuation port in a heating configuration. Prior to heating the container, the evacuation port is at least partially opened. The container is then heated. Following the heating step, the evacuation port is placed in a closed configuration and is sealed in one embodiment. In one such embodiment, the vacuum on the container is maintained for a period of time following the heating step prior to sealing. Optionally, the maintenance of the vacuum in the container is verified. In one such embodiment, the sealing step is performed by welding an evacuation plug to the evacuation port to seal the evacuation port. In such an embodiment, the welding is performed using an orbital welder.

In another embodiment, the evacuation nozzle is coupled to the filling port of the container. In such an embodiment, the filling plug is closed while the evacuation nozzle is couple to the evacuation nozzle. In one such embodiment, the filling port includes a filling plug which is threadably coupled to the filling port. The filling plug allows air and/or gas to pass through a filter, located in the filling plug, and between the filling plug and the filling port in a heating configuration. Prior to heating the container, the filling port is at least partially opened. The evacuated container is then heated. Following the heating step, the filling port is closed in a closed configuration and is sealed. In one such embodiment, the vacuum on the container is maintained for a period of time following the heating step prior to sealing. Optionally, the maintenance of the vacuum in the container is verified. In one such embodiment, the sealing step is performed by welding the filling plug to the filling port to seal the filling port. In such an embodiment, the welding is performed using an orbital welder.

Following the sealing step, the sealed container is transferred from the second cell to the third cell via a second moveable shielded isolation door. In some embodiments, the sealed container is transferred from the second cell to the third cell inside a containment. The sealed container is then subjected to hot isostatic pressing. In some embodiments, the sealed container is subjected to hot isostatic pressing while inside the containment. In some embodiments, hot isostatic pressing includes subjecting the sealed container to a high temperature, high pressure argon atmosphere. In some embodiments, the sealed container is initially cooled in a cooling cabinet after hot isostatic pressing. Following the hot isostatic pressing, the container is transferred from the third cell to the fourth cell via a third moveable shielded isolation door. In the fourth cell, according to some embodiments, the container undergoes final cooling. In further embodiments, the container is packaged in a canister for transport and storage.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

We claim:

1. A system for transferring hazardous waste material into a sealable container, the system comprising:
    a container configured to sealingly contain the hazardous waste material, the container including a filling port;
    a hopper for supplying hazardous waste material;
    a filling nozzle having:
        a valve body having a distal end, an inner surface, and an outer surface, the valve body including a valve seat proximate the distal end, the outer surface proximate the distal end being configured to sealingly and removeably couple the valve body to an inner surface of a filling port of the container,
        a valve head;
        a valve stem extending axially from the valve head through at least a portion of the valve body;
        a passage defined between the valve stem and the inner surface of the valve body, the passage being fluidly coupled to the hopper for transfer of hazardous waste material from the hopper; and
        a vacuum nozzle sealingly and removably couplable with an exhaust port in the distal end of the valve body, the vacuum nozzle being in sealed fluid communication with the valve body in a filling configuration;
    wherein the valve head has a valve face configured to form a seal with the valve seat proximate the distal end in a closed configuration to seal the filling nozzle, the valve head configured to allow the passage and the container to be fluidly coupled with one another in an open configuration in use for transfer of hazardous waste material from the passage into the container,
    wherein, in the open configuration in use, the valve head extends distally from the valve body and into the container, and
    wherein the outer surface of the valve body includes a first seal proximate the distal end to sealingly engage the inner surface of the filling port and a second seal, spaced from the first seal, to further sealingly engage the inner surface of the filling port.

2. The system of claim 1 further comprising:
    a first scale coupled to the hopper and configured to determine an initial hopper weight;
    a second scale configured to be coupled to the container and to determine a container fill weight; and
    a processor coupled to the first scale and the second scale and configured to compare the initial hopper weight to the container fill weight.

3. The system of claim 2, wherein the hopper includes a volume substantially equal to a volume of the container.

4. The system of claim 3 further comprising:
    at least one vibrator coupled to the hopper.

5. The system of claim 1 further comprising:
    at least one vibrator coupled to a bottom of the container.

6. The system of claim 1 further comprising:
    a sensor disposed in the valve head, wherein the sensor is configured to determine a level of hazardous material in the container in use.

7. The system of claim 6, wherein the sensor extends distally from the valve body.

8. The system of claim 1, wherein the valve body includes:
    a first branch section coupled to the hopper, and
    a second branch section including the distal end and having a proximal end, the proximal end coupled to a drive mechanism configured to move the valve stem.

9. The system of claim 8, wherein the valve stem extends through the proximal end of the second branch section, the proximal end including a seal coupled to a portion of the valve stem.

10. The system of claim 1, wherein the vacuum nozzle extends through the distal end of the valve body.

11. The system of claim 10, wherein the vacuum nozzle includes a filter proximate the distal end of the valve body.

12. The system of claim 1 further comprising:
    a lift mechanism configured to lift the container toward the fill nozzle.

13. The system of claim 1, wherein the container is at least initially under negative pressure.

14. The system of claim 1, wherein the filling port of the container is configured to be sealed closed after decoupling the valve body from the filling port.

15. The system of claim 1, wherein the hopper is fluidly isolated from an exterior of the filling nozzle in the closed configuration.

16. The system of claim 1, wherein an interior of the filling nozzle is fluidly isolated from an exterior of the filling nozzle in the closed configuration.

17. The system of claim 1, wherein the valve seat is fixed against movement relative to the hopper.

18. The system of claim 1, wherein the valve body is a unitary piece.

19. The system of claim 1, further comprising:
    hazardous waste material, wherein, in the open configuration during use, the hazardous waste material extends from the hopper to the container via the passage.

* * * * *